United States Patent
Ogawa et al.

(10) Patent No.: US 6,314,571 B1
(45) Date of Patent: Nov. 6, 2001

(54) EPG DATA COLLECTION AND DELIVERY SYSTEM AND EPG DATA COLLECTION AND DELIVERY DEVICE THEREIN

(75) Inventors: Michiyo Ogawa; Yoshiaki Kato, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/351,456

(22) Filed: Jul. 12, 1999

(30) Foreign Application Priority Data

Sep. 21, 1998 (JP) .................................................. 10-266001

(51) Int. Cl.[7] .......................... H04N 5/445; H04N 7/10; H04N 7/173; H04N 7/16
(52) U.S. Cl. ................................. 725/48; 725/32; 725/92; 725/114; 725/138
(58) Field of Search .................................... 348/6, 7, 722, 348/906; 345/327; 709/217, 219; 455/6.1, 5.1, 4.2; 725/48, 32, 92, 114, 138

(56) References Cited

U.S. PATENT DOCUMENTS 5,576,755 * 11/1996 Davis et al. ............................ 348/13
5,579,055 * 11/1996 Hamilton et al. ..................... 348/476
5,666,645 * 9/1997 Thomas et al. ....................... 455/6.1
6,005,562 * 12/1999 Shiga et al. ........................... 345/327

FOREIGN PATENT DOCUMENTS 8289267   11/1996   (JP) .

* cited by examiner

Primary Examiner—Andrew Faile
Assistant Examiner—Hai V. Tran

(57) ABSTRACT

The program guide data collection and delivery device for collecting and delivering program guide data of a plurality of broadcasting stations respectively broadcasting their own programs collects own-station EPG data from a plurality of program guide data transmitting devices respectively corresponding to each of the broadcasting stations, and delivers all-station EPG data to a plurality of program guide data providing devices. By this configuration, the rate of inter-access among the stations is not made high regardless of a frequent modification of EPG data of the broadcasting stations, and the program guide viewers of one station can be provided with the latest EPG data of other stations without changing the individual system configuration, even when there is an increase in the number of broadcasting stations within the whole system.

19 Claims, 12 Drawing Sheets

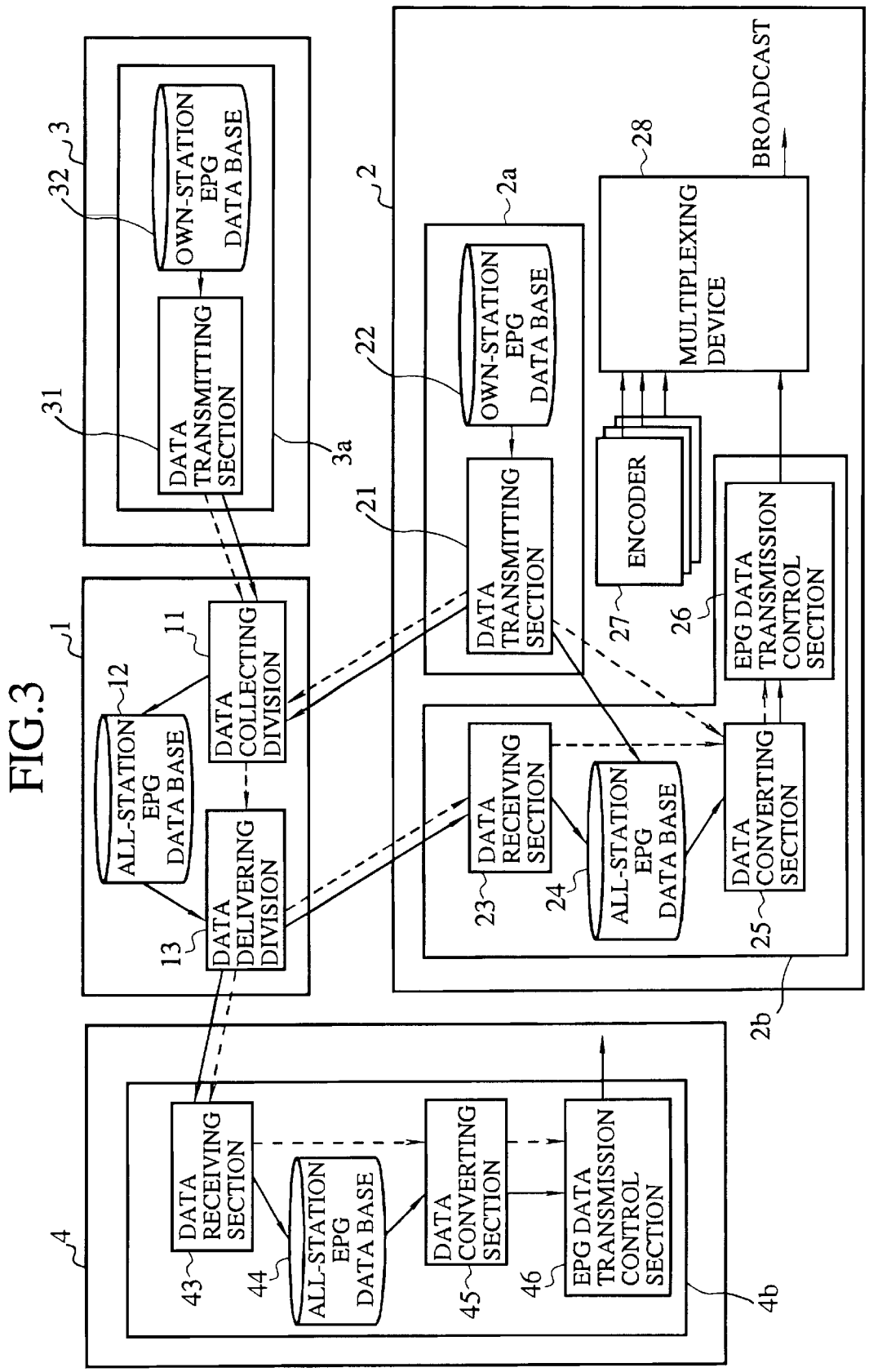

FIG.11A

| SERVICE_ID | 0x1234 | |
|---|---|---|
| EVENT_ID | 0x3333 | 0x3334 |
| START_TIME | 1998.7.7 19:00:00 | 1998.7.7 21:00:00 |
| DURATION | 120 MINUTES | 90 MINUTES |
| RUNNING_STATUS | EXECUTING | NOT EXECUTING |
| | SPORTS 1 | DRAMA 3 | ... |

FIG.11B

| SERVICE_ID | 0x1234 | |
|---|---|---|
| EVENT_ID | 0x3333 | 0x3334 |
| START_TIME | 1998.7.7 19:00:00 | 1998.7.7 21:30:00 |
| DURATION | 150 MINUTES | 90 MINUTES |
| RUNNING_STATUS | EXECUTING | NOT EXECUTING |
| | SPORTS 1 | DRAMA 3 |

FIG.11C

| SERVICE_ID | 0x1234 |
|---|---|
| EVENT_ID | 0x3333 |
| DURATION | +30 MINUTES |
| EVENT_ID | 0x3334 |
| START_TIME | +30 MINUTES |
| | MODIFIED CONTENT |

EPG DATA COLLECTION AND DELIVERY SYSTEM AND EPG DATA COLLECTION AND DELIVERY DEVICE THEREIN

BACKGROUND OF THE INVENTION

1. Field of the Invention

The present invention relates to a program guide data collection and delivery system for providing electronic program guide data (hereinafter referred to just as "EPG data") which is the data concerning the programs being broadcast from a plurality of broadcasting stations to the program guide viewers of their respective stations, and also relates to a program guide data collection and delivery device that performs transmission and reception of the EPG data to and from these broadcasting stations.

2. Description of the Related Art

FIG. 13 is a schematic diagram showing a conventional program guide data transmitting device as disclosed in Japanese Patent Application Laid-Open No. 8-289267. In the figure, reference numeral 701 denotes a switcher that selects signals of predetermined plural numbers of broadcasting channels among image signals and audio signals provided in the digital form received from a plurality of broadcasting stations, numeral 702 denotes a promotion channel generating device, which transforms the signals of a predetermined limited number of channels among those of a plurality of channels input to this switcher 701 into a sole signal to be displayed on one single monitor screen. Reference numerals 703a, 703b and 703c each denotes an encoder for coding the image signals and audio signals fed from the switcher 701 by use of MPEG method (Moving Picture Expert Group method), numeral 709 denotes an EPG data generating device for generating EPG data, numeral 708 denotes a program transmission control device for outputting control signals for controlling the switcher 701 and the EPG data generating device 709 and so on, numerals 704a, 704b, 704c and 704d each denotes a multiplexing device (abbreviated to "MUX" in the figure") for respectively multiplexing the signals input from the promotion channel generating device 702, encoders 703a to 703c and from the EPG data generating device 709, and outputting thereafter these multiplexed signals. Further, reference numerals 705a, 705b, 705c and 705d each denotes a digital converter circuit that converts the multiplexed signals fed from each of the multiplexing devices 704a through 704d into digital signals, numeral 706 denotes a combiner circuit that combines the signals fed from the digital converter circuits 705a through 705d, and numeral 707 denotes a satellite-transmission antenna for transmitting the signals fed from the combiner circuit 706 to a corresponding satellite.

The operation of the above conventional program guide data transmitting device is as follows.

In FIG. 13, the EPG data generating device 709 generates EPG data consisting of bit map data such as icons, promotion logos, categories and so on which are to be transmitted under control of the program transmission control device 708, and outputs the thus generated EPG data to the promotion channel generating device 702 and also to the multiplexing devices 704a through 704d. The promotion channel generating device 702 superimposes the bit map data fed from the EPG data generating device 709 on the image signals for a small screen each input through the switcher 701. The multiplexing devices 704a through 704d multiplex the image signals and audio signals fed thereto from the promotion channel generating circuit 702 and the encoders 703a through 703d. The digital converter circuits 705a through 705d convert the input signals to digital signals by a predetermined converting method, and output the converted signals to the combiner circuit 706. The combiner circuit 706 combines the signals output from the digital converter circuits 705a through 705d, and transmits the thus composite signal to the satellite by way of an antenna 707.

However, as explained above, since the conventional program guide data transmitting device is provided as an individual equipment in each of the broadcasting stations within a program guide data collection and delivery system, and is not considered in relation to other broadcasting stations, in a case that there are already many broadcasting stations within the system, each of the stations is not capable of providing the latest EPG data of other stations for the program guide viewers of its own station.

Further, in a case that there is a modification of EPG data in each broadcasting station, the modified EPG data can be directly broadcast to all other stations in order that each broadcasting station can provide other stations with the latest EPG data of itself. However, in this case, if the modification of EGP data frequently occurs in each broadcasting station, the frequency of inter-access among the plurality of broadcasting stations is thereby made higher, and in addition to this, each time a broadcasting station is newly founded, the already existing plurality of stations have to change their respective system configurations.

SUMMARY OF THE INVENTION

The present invention has been proposed to solve the problems aforementioned, and it is an object of the present invention to provide an EPG data collection and delivery system and a program guide data collection and delivery device therein, wherein the modification in the EPG data of each of the broadcasting stations within the system occurs frequently, the rate of inter-access among the stations is not made high, and that each station is capable of providing the program guide viewers of its own station with the latest EPG data of other stations without changing the individual system configuration, even when there is an increase in the number of broadcasting stations within the whole system.

In order to achieve the above object, the program guide data collection and delivery system according to the first aspect of the present invention is constructed such that it comprises: a program guide data collection and delivery device for collecting and delivering program guide data of a plurality of broadcasting stations respectively broadcasting their own programs, a plurality of program guide data transmitting devices respectively corresponding to each of the plurality of broadcasting stations for transmitting the program guide data of their respectively own broadcasting stations to the program guide data collection and delivery device; and a plurality of program guide data providing devices for providing the program guide data of all of the plurality of broadcasting stations delivered from the program guide data collection and delivery device to the program guide viewers of their own broadcasting stations.

The program guide data collection and delivery system according to the second aspect of the present invention having the above configuration comprises; a data collecting division for collecting program guide data of each of the broadcasting stations transmitted from the plurality of program guide data transmitting devices, a program guide data storing section for storing the program guide data of each of the broadcasting stations collected by the data collecting division, and a data delivering division for delivering the program guide data of each of the broadcasting stations stored in the program guide data storing section to a plurality of program guide data providing devices, and wherein each of the plurality of program guide data transmitting devices comprises; an own-station program guide data storing section for storing the program guide data broadcast from its own broadcasting station, and a data transmitting section for transmitting the own-station program guide data of its own broadcasting station to the program guide data collecting division of the program guide data collection and delivery device, and further wherein each of the plurality of program guide data providing devices comprises; a data receiving section for receiving the program guide data delivered from the program guide data delivering division of the program guide data collecting device, an all-station program guide data storing section for storing the program guide data received by the data receiving section, a data converting section for converting the program guide data stored in the all-station program guide data storing section to a predetermined format, and a transmission control section for controlling the transmission of the program guide data converted to the predetermined format.

The program guide data collection and delivery system according to the third aspect of the present invention having the above configuration is constructed such that the data transmitting section in the program guide data transmitting device of its own broadcasting station directly rewrites the data stored in the all-station program guide data storing section in the corresponding program guide data providing device in a case that there has been a modification in the own-station program guide data storing section and also informs the corresponding data converting section of the fact that there has been a modification in the all-station program guide data storing section.

The program guide data collection and delivery system according to the fourth aspect of the present invention having the configuration of the first aspect comprises; a data collecting division for collecting program guide data of each of the broadcasting stations transmitted from the plurality of program guide data transmitting devices, a program guide data storing section for storing the program guide data of each of the broadcasting stations collected by the data collecting division, a data converting section for converting the program guide data stored in the program guide data storing section to a predetermined format, and a data delivering division for delivering the format-converted program guide data of each of the broadcasting stations to each of the program guide data providing devices, and wherein each of the plurality of program guide data transmitting device comprises; an own-station program guide data storing section for storing the program guide data broadcast from its own broadcasting station, and a data transmitting section for transmitting the own-station program guide data of its own broadcasting station to the program guide data collecting division of the program guide data collection and delivery device, and further wherein each of the plurality of program guide data providing devices comprises; a data receiving section for receiving the program guide data delivered from the program guide data delivering division of the program guide data collection and delivery device, and a transmission control section for controlling the transmission of the program guide data fed from the data receiving section.

The program guide data collection and delivery system according to a further aspect of the present invention, having the configuration of the fourth aspect is constructed such that the program guide data transmitting device further comprises a data converting section for converting the program guide data stored in said own-station program guide data storing section to a predetermined format, and wherein in a case that there has been a modification in the data in the own-station program guide data, the data converting section reads out the data stored in said data storing means, and directly updates the data stored in the transmission control section.

The program guide data collection and delivery system according to a further aspect of the present invention, having the configuration of the fourth aspect is constructed such that the program guide data transmitting device further comprises a data converting section for converting the program guide data stored in the own-station program guide data storing section to a predetermined format, and wherein in a case that there has been a modification in the data in the own-station program guide data, the data transmitting section transmits the converted data from the data converting section to the program guide data collection and delivery device.

The program guide data collection and delivery system according to a further aspect of the present invention, having the configuration of the second aspect is constructed such that the data collecting division in the program guide data collection and delivery device comprises; a plurality of collecting sections corresponding to each of the program guide data transmitting devices, and a collection control section for controlling said plurality of collecting sections, and wherein the data delivering division of the program guide data collection and delivery device comprises; a delivering section corresponding to each of the program guide data providing devices, and a delivery control section for controlling the plurality of delivering sections.

The program guide data collection and delivery system according to a further aspect of the present invention, having the configuration of the first aspect is constructed such that the program guide data transmitting devices requires a transmission of the program guide data to the program guide data collection and delivery device.

The program guide data collection and delivery system according to a further aspect of the present invention, having the configuration of the first aspect is constructed such that the program guide data collection and delivery device requires a transmission of program guide data to each of the program guide data transmitting devices.

The program guide data collection and delivery system according to a further aspect of the present invention, having the configuration of the first aspect is constructed such that the program guide data collection and delivery device requires a transmission of program guide data to each of the program guide data providing devices.

The program guide data collection and delivery system according to the tenth aspect of the present invention, having the configuration of the first aspect is constructed such that when each of the program guide data providing devices requires a transmission of program guide data to the program guide data collection and delivery device.

The program guide data collection and delivery system according to a further aspect of the present invention, having the configuration of the first aspect is constructed such that when each of the program guide data transmitting devices transmits the program guide data of its own broadcasting station, it indicates the delivery starting time for starting the delivery of the program guide data to each of the program guide data providing devices.

The program guide data collection and delivery system according to another aspect of the present invention, having the configuration of the first aspect is constructed such that the program guide data collection and delivery device additionally indicates the delivery service starting time for starting the delivery of said program guide data to the program guide viewers, when it transmits the program guide data of all the broadcasting stations.

The program guide data collection and delivery system according to a further aspect of the present invention, having the configuration of the first aspect is constructed such that when a data modification has occurred in the program guide data of its own broadcasting station, each of the program guide data transmitting devices transmits the program guide data to the program guide data collection and delivery device as a difference value between the program guide data already transmitted and the program guide data after modification.

The program guide data collection and delivery system according to a further aspect of the present invention, having the configuration of the first aspect is constructed such that when the program guide data collection and delivery devices modifies the program guide data stored in the program guide data storing section therein, it transmits the program guide data to each of the program guide data providing devices as a difference value between the program guide data already transmitted and the program guide data after modification.

The program guide data collection and delivery system according to a further aspect of the present invention, having the configuration of the first aspect is constructed such that the program guide data collection and delivery device is provided with a data checking section for checking the data amount and the content of the program guide data transmitted from each of the program guide data transmitting sections.

The program guide data collection and delivery system according to a further aspect of the present invention, having the configuration of the first aspect is constructed such that the program guide data collection and delivery device transmits service control information regarding the method of providing program guide data to each of the program guide data providing devices.

The program guide data collection and delivery device according to a further aspect of the present invention is constructed such that it comprises; a data collecting division for collecting program guide data of each of a plurality of broadcasting stations transmitted from a plurality of program guide data transmitting devices, a program guide data storing section for storing the program guide data of each of the broadcasting stations collected by the data collecting division, and a data delivering section for delivering the program guide data of each of the broadcasting stations stored in the program guide data storing section to a plurality of program guide data providing devices.

BRIEF DESCRIPTION OF THE DRAWINGS

FIG. 3 is a schematic diagram of an EPG data collection and delivery system according to the third and fourth embodiments of the present invention.

FIGS. 11A to 11C are exemplary views each showing an example of a modification in the EPG data.

DETAILED DESCRIPTION OF THE PREFERRED EMBODIMENTS

Several embodiments of the present invention are explained in the following.

[First Embodiment]

Figure 1:
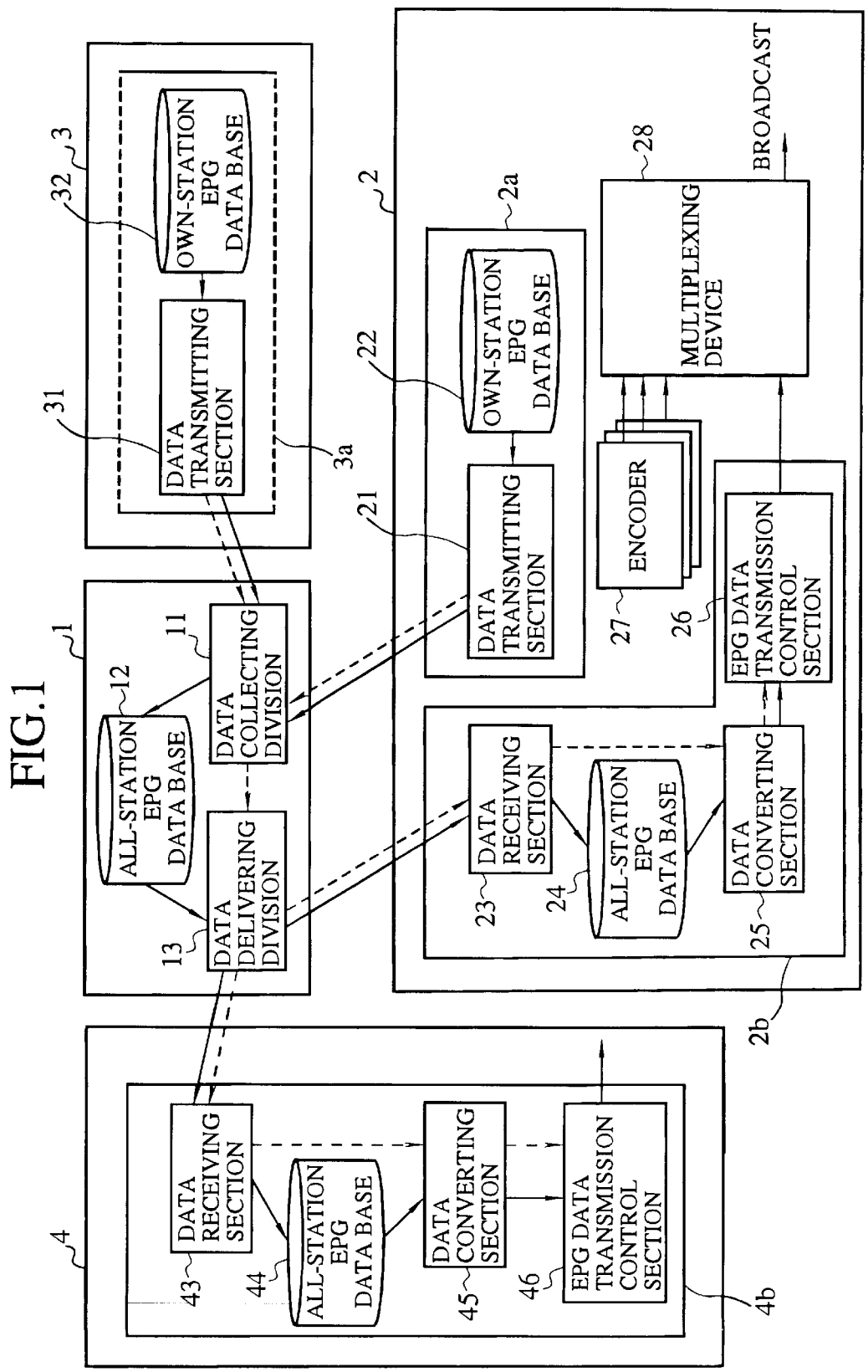
FIG. 1 is a schematic diagram of an EPG data collection and delivery system according to the first embodiment of the present invention.

FIG. 1 is a schematic diagram of an EPG data collection and delivery system according to a first embodiment of the present invention. In the figure, reference numeral 1 denotes an EPG data collection and delivery center (hereinafter may be referred to just as a "center") as a program guide data collection and delivery device for collecting and delivering EPG data, numeral 11 denotes a data collecting division for collecting the EPG data transmitted to the center 1, numeral 12 denotes an all-station EPG data base for storing the EPG data collected in the data collecting division 11, and numeral 13 denotes a data delivering division for delivering the data stored in the all-station EPG data base 12.

Further, reference numeral 2 denotes a TV broadcasting station, numeral 3 denotes a data broadcasting station, and numeral 4 denotes an Internet service station, wherein numerals 2a and 3a denote EPG data transmitting devices for transmitting the EPG data of respective broadcasting stations 2 and 3 (own-station EPG data), numerals 2b and 4b denote EPG data providing devices for providing the EPG data of all the stations within the system (all-station EPG data) to the program guide viewers of the respective stations 2 and 4. Further, reference numerals 21 and 31 denote data transmitting sections each for transmitting the EPG data of the respective stations 2 and 3 to the EPG data collection and delivery center 1, numerals 22 and 32 denote own-station EPG data bases each for storing the own-station EPG data of the respective stations 2 and 3, numerals 23 and 43 denote data receiving sections each for receiving the all-station EPG data delivered from the EPG data collection and delivery center 1, numerals 24 and 44 denote all-station EPG data bases each for storing the thus received all-station EPG data, numerals 25 and 45 denote data converting sections each for converting the data stored in the all-station EPG data base to a predetermined transmission format, numerals 26 and 46 denote EPG data transmission control sections each for transmitting the all-station data converted to the predetermined transmission format, numeral 27 denotes an encoder for coding video signals and audio signals, and numeral 28 denotes a multiplexing section for multiplexing the all-station EPG data input from the encoder 27 and also from the EPG data transmission control section 26.

Figure 2:
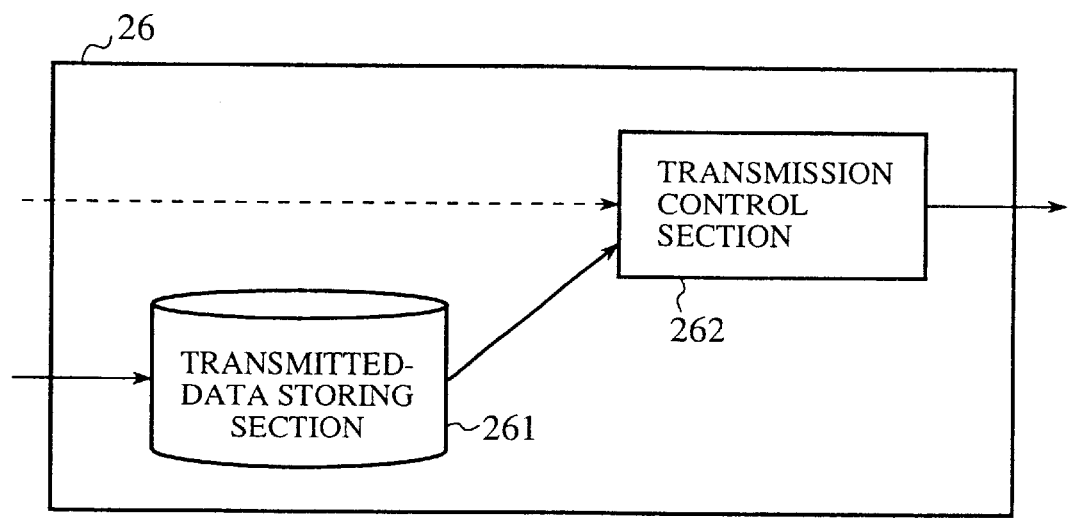
FIG. 2 is a schematic view showing the inner configuration of the EPG data transmission control section in the EPG data providing device shown in FIG. 1.

FIG. 2 shows an inner configuration of the EPG data transmission control section 26 in FIG. 1. In FIG. 2, reference numeral 261 denotes a transmitted-data storing section for storing the input data, and numeral 262 denotes a transmission control section for reading and outputting the data from the transmitted-data storing section 261. The EPG data transmission control section 46 of the Internet service station 4 also has the same configuration.

The operation of the EPG data collection and delivery system according to the first embodiment is now explained below.

The data transmitting section 21 in the EPG data transmitting device 2a of the TV broadcasting station 2 reads out, when a modification occurs in the EPG data base 22 thereof, the data to be transmitted from the own-station EPG data base 22, and transmits the read data to the EPG data collection and delivery center 1, together with additional information such as the broadcasting station identification code thereof, date information and so forth. The data collecting division 11 within the center 1 writes or adds the received EPG data on the all-station EPG data base 12, and also notifies the data delivering division 13 of the fact that there has been a modification in the all-station EPG data. The data delivering division 13 reads out the all-station EPG data of all the stations within the whole system. including the modified or added EPG data from the above station from the all-station EPG data base 12 of the collection and delivery center 1, and delivers the read-out data to all the EPG data providing devices; namely 2b and 4b in this embodiment, together with the additional information attached to each of the EPG data.

It is to be noted that the EPG data transmitting device 3a of the data broadcasting station 3 performs the same function as that performed by the EPG data transmitting device 2a of the TV broadcasting station 2 as explained above.

In the EPG data providing device 2b in the TV broadcasting station 2, the data receiving section 23 receives the all-station EPG data with additional information from the EPG data collection and delivery center 1, and overwrites or adds the received all-station EPG data on the all-station EPG data base 24, informing simultaneously the data converting section 25 of the fact that there has been a modification in the all-station data base 24.

The data converting section 25 converts the data of the all-station EPG data base 24 to a predetermined transmission format, such as the one regulated by the ARIB Standard STDB10 "Program Arrangement Information for use in digital broadcasts", or by the ATSC Standard A/65 "Program and System Information Protocol for Terrestrial Broadcast and Cable", and outputs thereafter the data in the thus converted format, together with additional information such as the delivery starting time, delivering frequency and so on to the EPG data transmission control section 26.

The EPG data transmission control section 26 stores, as shown in FIG. 2, the data input to the transmitted-data storing section 261, and the transmission control section 262 reads out necessary data from the transmitted-data storing section 261 at the frequency specified by the additional information, and outputs thereafter to the multiplexing section 28.

The multiplexing section 28 multiplexes the video or audio signal fed from the encoders 27 and the data fed from the EPG data transmission control section 26, and outputs thereafter to the program guide viewers.

Further, the EPG data providing device 4b in the Internet service station 4 performs the same function as the EPG data providing device 2b of the TV broadcasting station 2. However, in the data converting section 45 therein, the data is converted to a predetermined transmission format such as HTML or the like, which is especially for the Internet service. Still further, the EPG data transmission control section 46 outputs all-station EPG data on condition that there is an access from a user.

As explained above, according to the first embodiment of the present invention, there is provided an EPG data collection and delivery center 1 within the whole EPG data collection and delivery system, wherein the EPG data collection and delivery center 1 collects EPG data from all the EPG data transmitting devices such as 2a in the TV broadcasting station 2 and 3a in the data broadcasting station 3, and broadcasts all-station EPG data to all the EPG data providing devices such as 2b in the TV broadcasting station 2 and 4b in the Internet service station 4, so that each of the EPG data providing devices 2b and 4b can obtain EPG data of all the broadcasting stations within the whole EPG data collection and delivery system, and thus they can provide the data to the program guide viewers or the users thereof.

Further, each of the EPG data transmitting devices 2a and 3a, and each of the EPG data providing devices 2b and 4b only have to access the EPG data collection and delivery center 1, in other words, they can ignore the relation with other stations, so that even when some new stations are added to the system, the EPG data collection and delivery system can be expanded without causing any affect to the already existing stations.

As a result, even when there is a frequent modification in the EPG data in each of the stations, an accessing frequency among the stations is not made high, and further, even when a new station is added to the system, each of the broadcasting stations can provide the latest EPG data of other stations to the program guide viewers of its own-stations, even without changing its own systems.

(Second Embodiment)

In the first embodiment above, the TV broadcasting station 2, the data broadcasting station 3 and the Internet service station 4 are shown only one for each as shown in FIG. 1. However, in this second embodiment, the broadcasting station 2, the data broadcasting station 3 and the Internet service station 4 can be employed two or more for each, or only some of these three kinds can be employed in the system. Further, the TV broadcasting station 2 may be without the EPG data providing device 2b, the data broadcasting station 3 may be provided with an EPG data providing device, and the Internet service station 4 may be provided, as a matter of fact, with an EPG data transmitting device and so on. In other words, the EPG data transmitting device and the EPG data providing device can both be provided within one broadcasting station, or separately in different stations.

(Third Embodiment)

In the first embodiment above, the EPG data collection and delivery center 1 broadcasts the all-station EPG data to which there is a modification or addition, to all the EPG data providing devices within the EPG data collection and delivery system. However, in this third embodiment, it is arranged such that the all-station EPG data is not delivered to the EPG data providing device of the station from which modified or added own-station EPG data has been transmitted to the center 1.

FIG. 3 is a schematic diagram of the EPG data collection and delivery system according to the third embodiment of the present invention.

In FIG. 3, for example in a case that the EPG data transmitting device 2a of the TV broadcasting station 2 transmits its own EPG data to the EPG data collection and delivery center 1, the data delivering division 13 does not have to transmit the all-station EPG data to the EPG data providing device 2b of the TV broadcasting station 2.

In this case, the data transmitting section 21 of the EPG data transmitting device 2a reads out, when a modification occurs in the EPG data base 22, the data to be transmitted from the EPG data base 22, and transmits the thus read-out data to the EPG data collection and delivery center 1, rewriting the all-station EPG data base 24 in the EPG data providing device 2b of itself simultaneously. The data transmitting section 21 informs the data converting section 25 in the EPG data providing device 2b of the fact that there has been a modification in the all-station EPG data base 24.

By these transactions, according to the third embodiment of the present invention, unnecessary transmission of all-station EPG data between the EPG data collection and delivery center 1 and the broadcasting station from which the modified or added EPG data has been transmitted to the center 1 can be omitted.

Further, in the TV broadcasting station 2 where there has been a modification in its own EPG data, the data transmitting section 21 directly modifies the all-station EPG data base 24 without passing through the EPG data collection and delivery center 1, before transmitting the EPG data to the EPG data collection and delivery center 1, so that if the EPG data of its own-station is required to be modified in real time, it can be multiplexed and broadcast to the program guide viewers faster, as it does not pass through the EPG data collection and delivery center 1.

(Fourth Embodiment)

In the third embodiment above, it is arranged such that in the broadcasting station 2 in which the EPG data transmitting device 2a and the EPG data providing device 2b are both provided, when there is a modification in its own-station EPG data, the EPG data transmitting device 2a directly accesses the EPG data providing device 2b, and the EPG data collection and delivery center 1 does not transmit all-station EPG to the EPG transmitting device 2b of the TV broadcasting station 2. However, in this fourth embodiment, it is arranged such that the EPG data collection and delivery center 1 delivers all-station EPG data to all the EPG data providing devices, and if the all-station EPG data delivered from the EPG data collection and delivery center 1 is the data of its own broadcasting station, the data receiving section 23 in the EPG data providing section 2b of the TV broadcasting station 2 does not overwrite the all-station EPG data base 24.

By these transactions, according to the fourth embodiment of the present invention, since all-station EPG data is delivered to all the EPG data providing devices in the system, which is different from the third embodiment, the EPG data collection and delivery center 1 does not have to consider the relation between the EPG data transmitting device from which the modified EPG data is transmitted thereto and the EPG data providing device to which all-station EPG data is transmitted, so that the process can be greatly simplified.

Further, similarly to the third embodiment, in the TV broadcasting station 2 where there has been a modification in its own EPG data, the data transmitting section 21 directly modifies the all-station EPG data base 24 without passing through the EPG data collection and delivery center 1, before transmitting the EPG data to the EPG data collection and delivery center 1, so that if the EPG data of its own-station is required to be modified in real time, it can be multiplexed and broadcast without passing through the EPG data collection and delivery center 1, so that it can be provided to the program guide viewers faster.

(Fifth Embodiment)

The fifth embodiment of the present invention is explained as follows.

Figure 4:
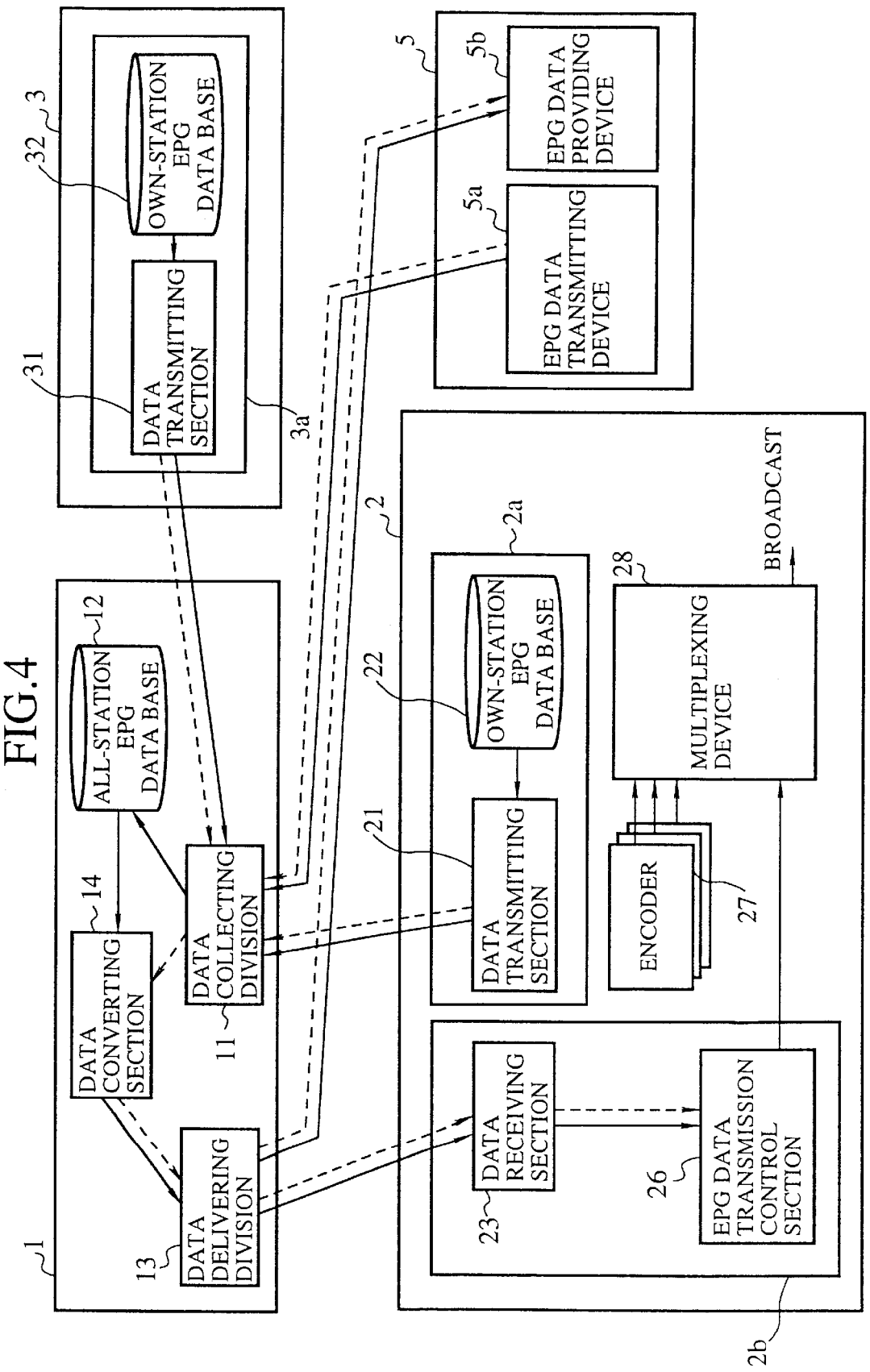
FIG. 4 is a schematic diagram of an EPG data collection and delivery system according to the fifth embodiment of the present invention.

FIG. 4 is a schematic diagram of the EPG data collection and delivery system according to the fifth embodiment. In the figure, reference numerals 1 through 3, 2a, 2b, 11 through 13, 21 through 23, 26 through 28 and 31 through 32 are same as the configuring elements of the first embodiment.

Further, reference numeral 5 denotes a TV broadcasting station, numeral 5a denotes an EPG data transmitting device for providing the EPG data of its own-station having the same configuration as that of the EPG data transmitting device 2a of the TV broadcasting station 2, numeral 5b denotes an EPG data providing device having the same configuration as that of the EPG data providing device 2b of the TV broadcasting station 2 for providing all-station EPG data to the program guide viewers of its own-station, numeral 14 denotes a data converting section for converting the data stored in the all-station EPG data base 12 within the EPG data collection and delivery center 1 to a predetermined transmission format. It is to be noted that the inner configuration of the EPG data transmission control section 26 in FIG. 4 is the same as that in FIG. 2.

Figure 5:
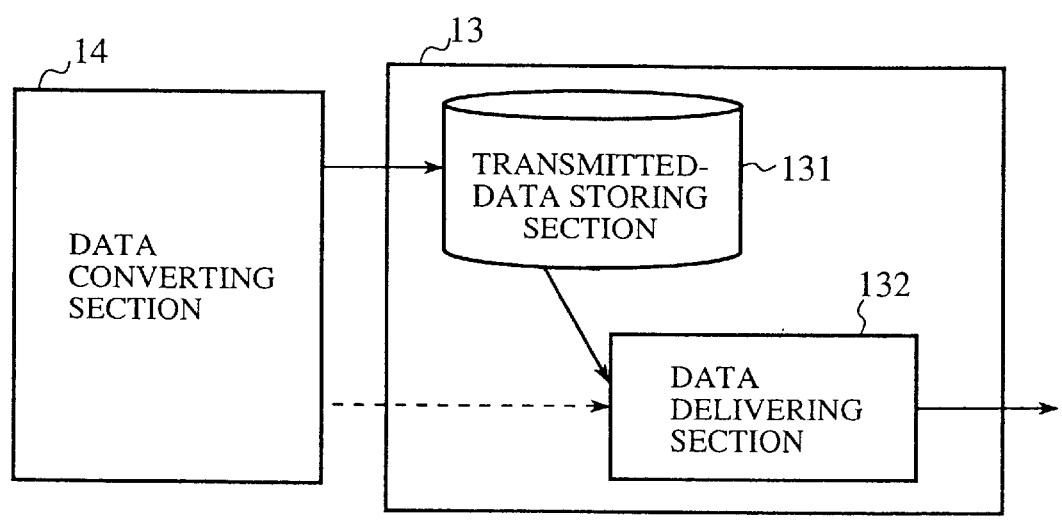
FIG. 5 is a schematic view showing the inner configuration of the EPG data delivering division in the EPG data collection and delivery center shown in FIG. 4.

FIG. 5 is a schematic diagram of the inner configuration of the data delivering division 13 in the EPG data collection and delivery center 1 shown in FIG. 4 according to the. fifth embodiment of the present invention. In FIG. 5, reference numeral 131 denotes a transmitted-data storing section for storing the input data, and numeral 132 denotes a data delivering section for reading and outputting the data stored in the transmitted-data storing section 131.

The operation of the EPG data collection and delivery system according to the present embodiment is now explained below.

The data transmitting section 21 in the EPG Data Transmitting Section Device 2a of the TV broadcasting station 2 reads out, when a modification occurs in the EPG data base 22, the data to be transmitted from the own-station EPG data base 22, and transmits the thus read data to the EPG data collection and delivery center 1, together with additional information such as the broadcasting station identification code thereof, date information and so forth.

In the EPG data collection and delivery center 1, the data collecting division 11 overwrites or adds the thus received EPG data on the all-station EPG data base 12 in accordance with the additional information, and also notifies the fact that there has been a modification in the all-station EPG data base 12 to the data converting section 14. The data converting section 14 converts the EPG data specified by the data collecting division 11 to a predetermined format such as the one regulated by the ARIB Standard STD-B10 "Program Arrangement Information for use in digital broadcasts", or by the ATSC Standard A/65 "Program and System Information Protocol for Terrestrial Broadcast and Cable", and overwrites or adds thereafter the data in the converted format to the transmitted-data storing section 131 within the data delivering division 13, and also informs the additional information such as the transmission starting time, transmission frequency and so on added to the already converted all-station EPG data to the data delivering device 132. The data delivering device 132 reads out the all-station EPG data to be transmitted from the transmitted-data storing section 131, and delivers the EPG data to all the EPG data providing devices together with the additional information.

It is to be noted that the EPG data transmitting section 3a of the data broadcasting station 3, and the EPG data transmitting section 5a of the TV broadcasting station 5 perform the same operation as that of the EPG data transmitting device 2a of the TV broadcasting station 2.

On the other hand, in the EPG data providing device 2b of the TV broadcasting station 2, the data receiving section 23 receives the all-station EPG data from the data delivering division 13 of the EPG data collection and delivery center 1, together with the additional information, and overwrites or adds the thus received all-station EPG data on to the data stored in the transmitted-data storing section 261 in the EPG data transmission control section 26 (FIG. 2) in accordance with the additional information, and also informs simultaneously the additional information to the data transmission control section 262.

The data transmission control section 262 reads out the necessary data from the transmitted-data storing section 261 at the frequency specified by the additional information, and outputs to the multiplexing section 28 shown in FIG. 4. The multiplexing section 28 multiplexes the data input from the EPG data transmission control section 26 on the video and audio signals fed from the encoders 27, and outputs these multiplexed signals.

It is to be noted that the EPG data providing device 5b of the TV broadcasting station 5 performs the same operation as that of the EPG data providing device 2b of the TV broadcasting station 2.

As explained above, according to the fifth embodiment of the present invention, similarly to the first embodiment, there is provided an EPG data collection and delivery center 1 within the EPG data collection and delivery system, wherein the EPG data collection and delivery center 1 collects own-station EPG data from all the EPG data transmitting devices such as 2a and 5a, of the TV broadcasting stations 2 and 5, respectively and 3a of the data broadcasting station 3, and delivers all-station EPG data to all the EPG data providing devices such as 2b and 5b, respectively of the TV broadcasting stations 2 and 5, so that each of the EPG data providing devices 2b and 5b can obtain EPG data of all the TV broadcasting stations including its own-station within the whole EPG data collection and delivery system, and thus they can provide the data to the program guide viewers or users thereof.

Further, similarly to the first embodiment, each of the EPG data transmitting devices, and each of the EPG data providing devices have only to access to the EPG data collection and delivery center 1, so that even when the number of these devices is increased within the system, the EPG data collection and delivery system can be expanded without causing any affect to the already existing devices.

Particularly, according to the fifth embodiment, since there is provided a data converting section 14 within the EPG data collection and delivery center 1, and the data can be converted to a predetermined transmission format therein, there is no need to perform a data conversion in each of the EPG data providing devices, so that the throughput of the system as a whole can be greatly improved.

Further, since the conversion of data format is performed within the EPG data collection and delivery center 1, the size and format of the EPG data delivered from all the broadcasting stations each provided with an EPG data providing device can be made uniform, and thus the EPG data transmitted from each of the stations can be readily adjusted with each other.

Still further, when the receivers, which belong to the program guide viewers and receive programs broadcast from their individual broadcasting stations, perform an EPG data re-obtaining process on the basis of updated information of the EPG data transmitted thereto such as the version numbers or the like regulated by the "Program Arrangement Information for use in digital broadcasts" regulated by the ARIB Standard STD-B10, or by the ATSC Standard A/65 "Program and System Information Protocol for Terrestrial Broadcast and Cable", since all the programs channels are provided with exactly the same EPG data, even when the currently receiving channel is changed to another one, unnecessary data obtaining operation can be avoided. This is because in the case that different version numbers are used in the respective broadcasting stations, if the currently receiving channel is changed to another, it cannot be checked whether the EPG data has been modified by the version number, so that all-station EPG data including the EPG data not updated has to be obtained again.

(Sixth Embodiment)

The sixth embodiment of the present invention is explained as follows.

In the fifth embodiment above, the EPG data collection and delivery center 1 broadcasts the all-station EPG data, to which there is a modification or addition, to all the EPG data providing devices within the EPG data collection and delivery system. However, in this sixth embodiment, it is arranged such that the all-station EPG data is not delivered to the EPG data providing device of the station from which modified or added own-station EPG data has been transmitted to the center 1.

Figure 6:
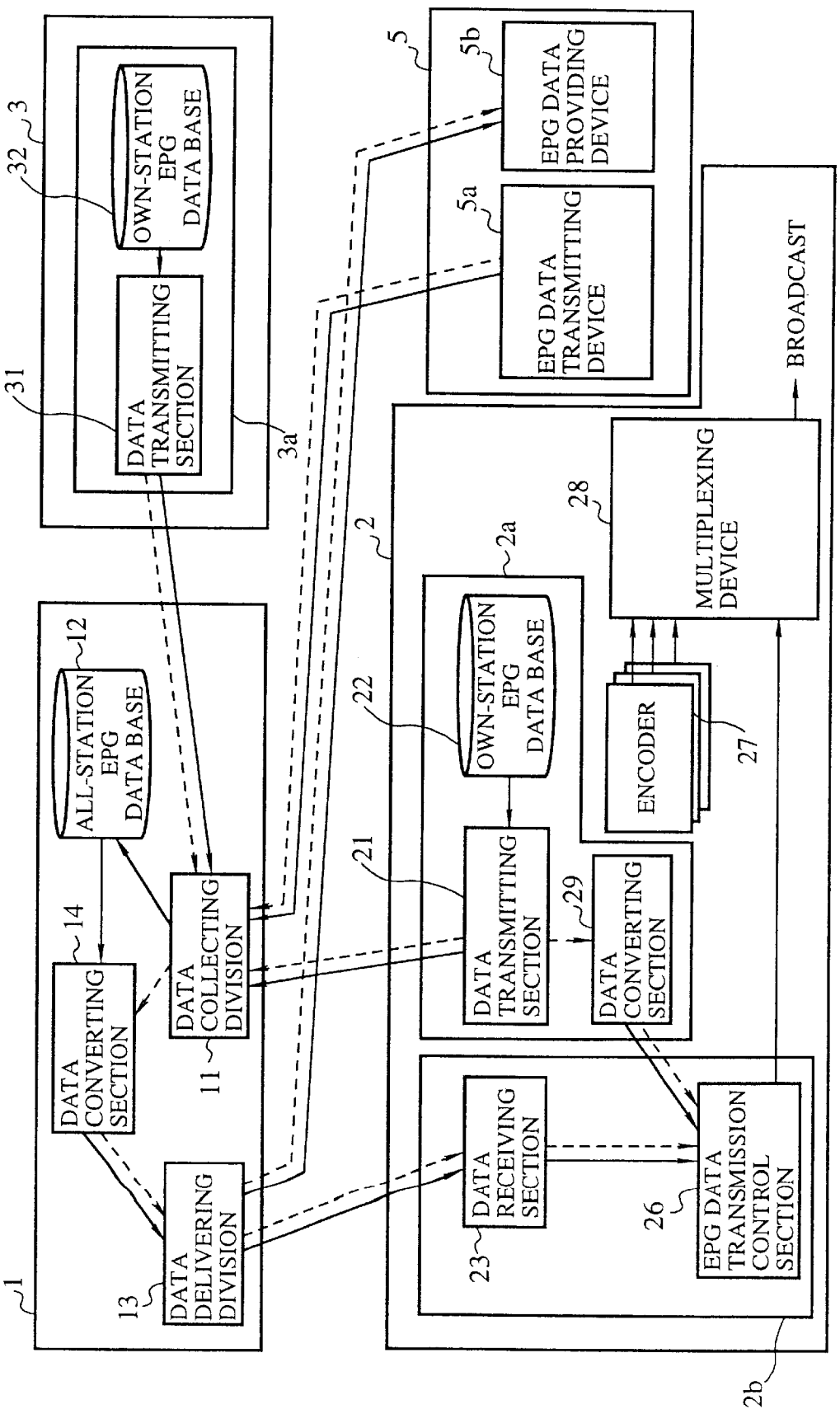
FIG. 6 is a schematic diagram of an EPG data collection and delivery system according to the sixth embodiment of the present invention.

FIG. 6 is a schematic diagram of the EPG data collection and delivery system according to the sixth embodiment of the present invention.

In FIG. 6, for example in a case that the EPG data transmitting device 2a of the TV broadcasting station 2 transmits its own EPG data to the EPG data collection and delivery center 1, the data delivering division 13 in the center 1 does not have to transmit the all-station EPG data to the EPG data providing device 2b of the TV broadcasting station 2.

Due to this, in this sixth embodiment, there is provided a data converting section 29 for converting the EPG data of its own-station 2 to a predetermined format within the EPG data transmitting device 2a, and this is the same for all other stations.

The data transmitting section 21 of the TV broadcasting station 2 reads outs, when a modification occurs in the own-station EPG data base 22, the data to be transmitted from the own-station EPG data base 22, and transmits the read-out data to the EPG data collection and delivery center 1, giving simultaneously an instruction of data conversion to the data converting section 29 in the same broadcasting station.

The data converting section 29 reads out the specified own-station EPG data from the own-station EPG data base 22, converts the read data to a predetermined format and outputs to the EPG data transmission control section 26, together with the additional information. Thereafter, the data converting section 29 rewrites the all-station EPG data stored in the transmitted-data storing section 261 to a new data, wherein only the own-station EPG data only has been converted to a predetermined format within the all-station EPG data, rewriting also the after-converted additional information simultaneously (see FIG. 2).

After these transactions, similarly to the other embodiments, the data transmission control section 262 reads out necessary data from the transmitted-data storing section 261 at a frequency specified by the additional information and outputs it to the multiplexing section 28, so that all-station EPG data and so on can be delivered therefrom to the program guide viewers.

As explained heretofore, according to the present embodiment, unnecessary data transmission between the broadcasting station 2 in which there has been a modification in its own-station EPG data and the EPG data collection and delivery center 1 is no longer required, so that it can be omitted.

Further, in the TV broadcasting station 2 where there has been a modification in its own-station EPG data, before the data transmitting section 21 transmits the thus modified EPG data to the EPG data collection and delivery center 1, the data converting section 29 converts the own-station EPG data to a predetermined format, and directly rewrites the own-station EPG data within the all-station EPG data stored in the transmitted-data storing section 261 of the EPG data transmission control section 26, so that if the own-station EPG data is required to be modified in real time, it can be multiplexed and delivered to the program guide viewers faster, as it does not pass through the EPG data collection and delivery center 1.

(Seventh Embodiment)

The EPG data collection and delivery system according to the seventh embodiment of the present invention is now explained as follows.

Figure 7:
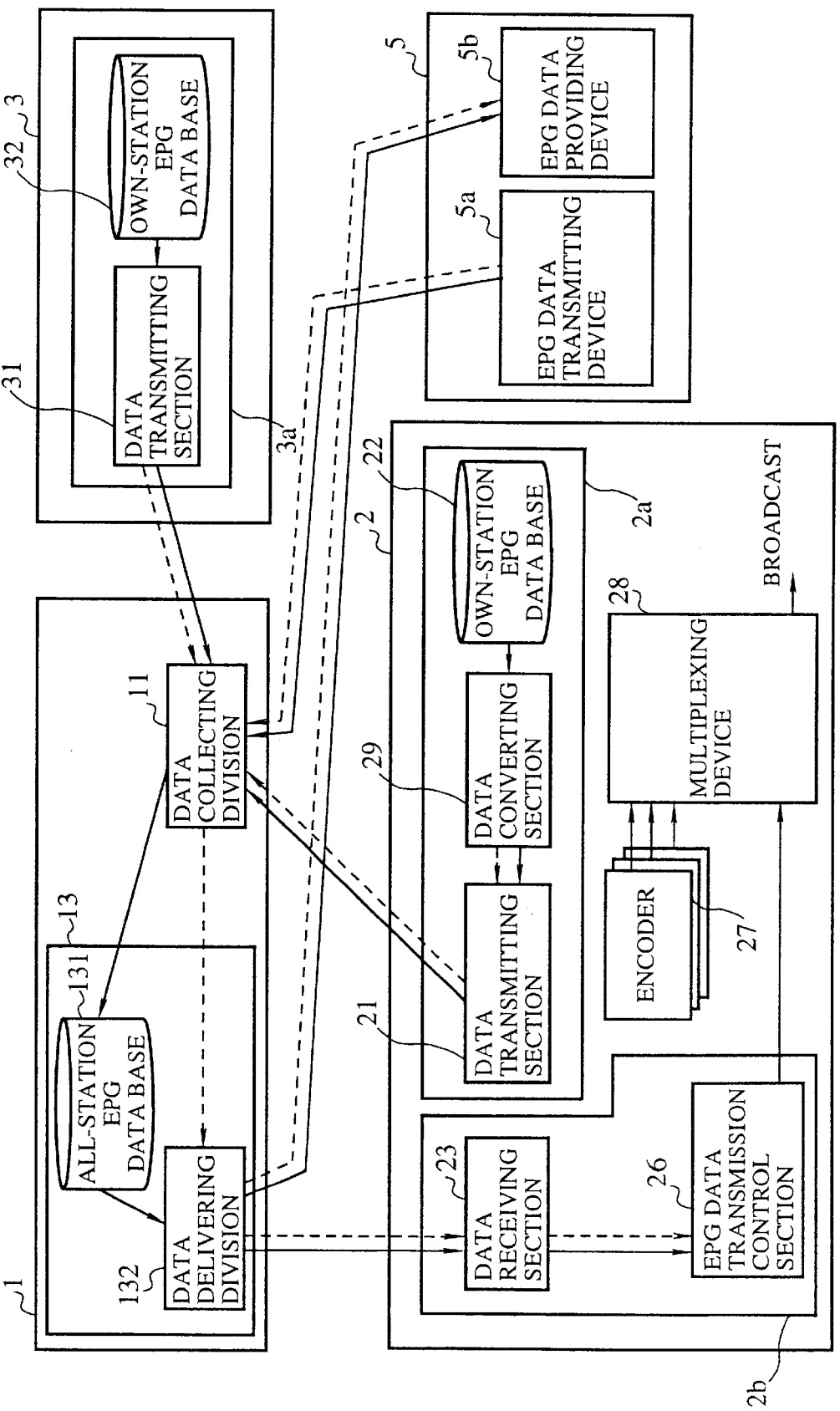
FIG. 7 is a schematic diagram of an EPG data collection and delivery system according to the seventh embodiment of the present invention.

FIG. 7 is a schematic diagram of the EPG data collection and delivery system of the seventh embodiment. In the figure, reference numerals 1 through 3, 2a, 2b, 3a, 11, 13, 21 through 23, 26 through 28 and 31 through 32 are same as the configuring elements of the first embodiment shown in FIG. 1, wherein reference numeral 29 denotes a data converting section for converting its own-station EPG data to a predetermined format. It is to be noted that the EPG data transmitting device 5a and the EPG data providing device 5b of the TV broadcasting station 5 have the same configuration as that of the EPG data transmitting device 2a and the EPG data providing device 2b of the TV broadcasting station 2, respectively.

The operation of the EPG data collection and delivery system according to this seventh embodiment is now explained below.

In the data broadcasting device 2a of the TV broadcasting station 2, when a modification has occurred in the own-station EPG data base 22, the data converting section 29 reads out the own-station EPG data to be transmitted from the own-station data base 22, and converts the thus read-out data to a predetermined transmission format. Thereafter, the data converting section 29 outputs the converted data to the data transmitting section 21, together with the additional information. The data transmitting section 21 then transmits the input data to the EPG data collection and delivery center 1.

It is to be noted that the EPG data transmitting device 3a of the data transmitting station 3 and the EPG data transmitting device 5a of the TV broadcasting station 5 have the same configuration as that of the EPG data transmitting device 2a of the TV broadcasting station 2.

On the other hand, in the EPG data collection and delivery center 1, the data collecting division 11 writes or adds the thus received EPG data on the all-station EPG transmitted-data storing section 131 in accordance with the additional information received simultaneously, and also notifies the additional information to the data delivering section 132. The data delivering section 132 reads out necessary data from the all-station EPG transmitted-data storing section 131 in accordance with the additional information, and delivers to all the EPG data providing devices together with the additional information.

After these transactions, in the TV broadcasting station 2, the data receiving section 23 in the EPG data providing device 2b overwrites or adds the thus received data on the transmitted-data storing section 261 in the EPG data transmission control section 26, and also transmits the additional information to the data transmission control section 262, simultaneously. The data transmission control section 262 reads out necessary data from the transmitted-data storing section 261 at a specified frequency, and outputs thereafter to the multiplexing device 28 shown in FIG. 7. The multiplexing device 28 multiplexes and outputs the data input from the EPG data transmission control section 26 together with video and audio signals fed from each of the encoders 27.

It is to be noted that the EPG data transmitting device 5b of the TV broadcasting station 5 performs the same operation as that of the EPG data transmitting section 2b of the TV broadcasting station 2.

As explained above, according to this seventh embodiment of the present invention, similarly to the first embodiment, there is provided an EPG data collection and delivery center 1 within the EPG data collection and delivery system, wherein the EPG data collection and delivery center 1 collects own-station EPG data from all the EPG data transmitting devices such as 2a, 3a and 5a, respectively of the TV broadcasting station 2, the data broadcasting station 3 and the TV broadcasting station 5, and delivers all-station EPG data to all the EPG data delivering devices such as 2b and 5b, respectively of the TV broadcasting stations 2 and 5, so that each of the EPG data providing devices 2b and 5b can obtain EPG data of all the broadcasting stations such as 2, 3 and 5 provided respectively with the EPG data transmitting device 2a, 3a and 5a within the whole EPG data collection and delivery system, and can thus provide the EPG data to the program guide viewers or users.

Further, similarly to the first embodiment, each of the EPG data transmitting devices, namely 2a, 3a and 5a, and each of the EPG data providing devices, namely 2b and 5b have only to access to the EPG data collection and delivery center 1, so that even when there is an increase in the number of devices within the system, the EPG data collection and delivery system can be expanded without affecting the already existing devices.

Further, before the EPG data are transmitted from the TV broadcasting stations 2, 3 and 5 to the EPG data collection and delivery center 1, the data converting section within the EPG data transmitting devices 2a, 3a and 5a, respectively, converts the EPG data to a predetermined format, and thereafter transmits the thus converted data to the data collection and delivery center 1, so that there is no need to perform a data conversion in the center 1, and each of the data transmitting devices has only to convert the EPG data regarding the station where it belongs, and thus the load of the data converting operation can be divided.

Still further, since the data conversion to a predetermined format is carried out within each of the EPG data transmitting devices 2a, 3a and 5a, data size and format of the EPG data transmitted from all the broadcasting stations each provided with an EPG data providing device can be made to a uniform one, and thus the EPG data transmitted from each of the stations can be readily adjusted with each other.

Still further, when the receivers, which belong to the program guide viewers and receive programs broadcast from their individual broadcasting stations, perform an EPG data re-obtaining process on the basis of updated information of the EPG data transmitted thereto such as the version numbers or the like regulated by the "Program Arrangement Information for use in digital broadcasts" regulated by the ARIB Standard STD-B10, or by the ATSC Standard A/65 "Program and System Information Protocol for Terrestrial Broadcast and Cable", since all the program channels are provided with exactly the same EPG data, even when the currently receiving channel is changed to another one, unnecessary data obtaining operation can be avoided. This is because in the case that different version numbers used in the respective broadcasting stations, if the currently receiving channel is changed to another, it cannot be checked whether the EPG data has been modified by the version number, so that all-station EPG data including the EPG data not updated has to be obtained again.

(Eighth Embodiment)

In the seventh embodiment above, the EPG data collection and delivery center 1 broadcasts the EPG data, to which there is a modification addition, to all the broadcasting stations. However, in this eighth embodiment, it is arranged such that the all-station EPG data is not delivered to the broadcasting station from which the all-station EPG data has been provided.

Figure 8:
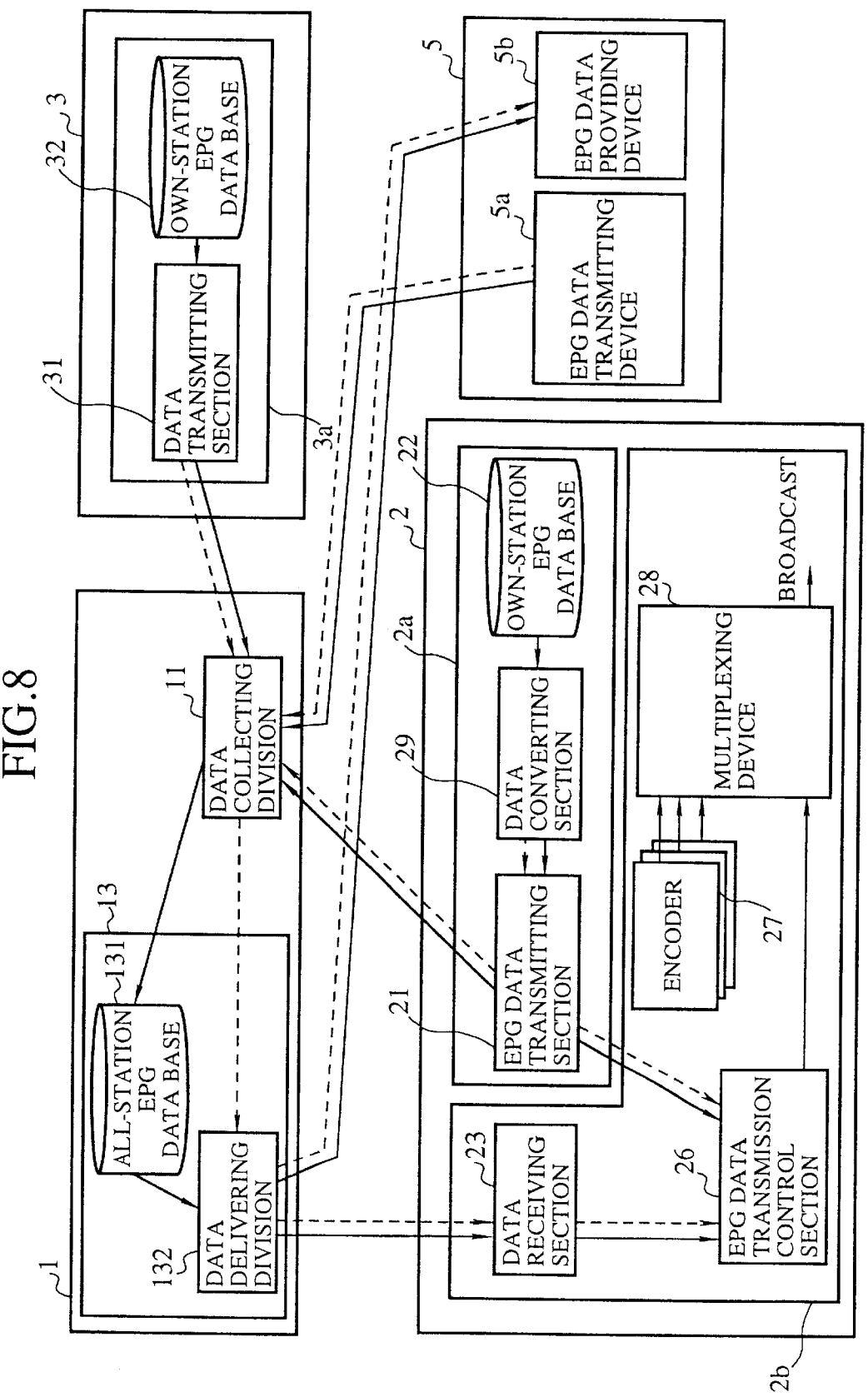
FIG. 8 is a schematic diagram of an EPG data collection and delivery system according to the eight embodiment of the present invention.

FIG. 8 is a schematic diagram of the EPG data collection and delivery system according to the eighth embodiment of the present invention.

In FIG. 8, for example in a case that there has been a modification in the data base 22 of the station 2 to which it belongs, and the EPG data transmitting device 2a therein transmits the EPG data of its own-station to the EPG data collection and delivery center 1, the data delivering section 13 in the EPG data collection and delivery center 1 does not transmit the all-station EPG data to the EPG data providing device 2a of the TV broadcasting station 2 from which the EPG data has been transmitted, and transmits the all-station EPG data only to the EPG data providing device 5b of another TV broadcasting station 5.

In this case, within the TV broadcasting station 2, the data converting section 29 reads out only the modified EPG data of its own-station 2 out of the own-station EPG data base 22, and converts the read data to a predetermined format, and transmits the thus converted data to the data transmitting section 21. Thereafter, the data transmitting section 21 transmits the own-station EPG data to the EPG data collection and delivery center 1 and also transmits it to the EPG data transmission control section 26 within its own-station 2, simultaneously. Alternatively, it may be arranged such that the data converting section 29 transmits the own-station EPG data to both the data transmitting section 21 and to the EPG data transmission control section 26.

By these transactions, according to this eighth embodiment, it is no longer necessary to perform an unnecessary data transmission between the EPG data collection and delivery center 1 and the TV broadcasting station 2 from which the data is first transmitted to the center 1.

Further, in the TV broadcasting station 2 where there has been a modification in the EPG data thereof, before the data transmitting section 21 transmits the EPG data to the EPG data collection and delivery center 1, the data transmitting section 21 directly changes the data in the all-station EPG data stored in the transmitted-data storing section 261 of the EPG data transmission control section 26, so that if the own-station EPG data is required to be modified in real time, it can be multiplexed and broadcast without passing through the EPG data collection and delivery center 1, and thus it can be delivered to the program guide viewers faster.

(Ninth Embodiment)

The EPG data collection and delivery system according to the ninth embodiment of the present invention is now explained as follows.

Figure 9:
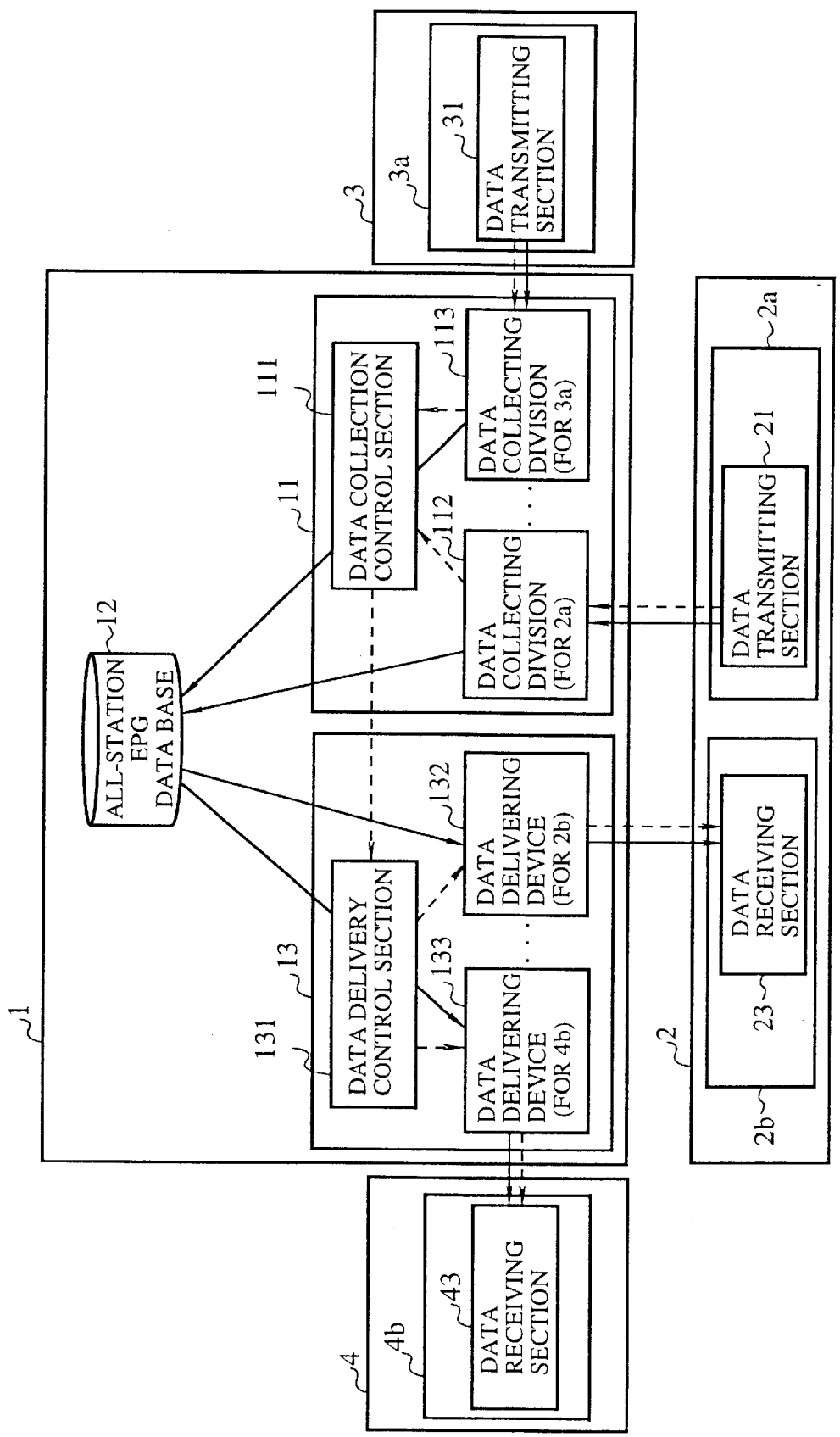
FIG. 9 is a schematic diagram of a portion related to the interface portion between the EPG data collection and delivery center and a plurality of broadcasting stations in the first embodiment, which is the characteristic portion of the ninth embodiment of the present invention.

FIG. 9 is a schematic diagram of the EPG data collection and delivery system of the ninth embodiment, showing into details the interface portion between the EPG data collection and delivery center 1 and each of the broadcasting stations 2, 3 and 4 of the first embodiment. In the same figure, reference numeral 111 denotes a data collection control section that is provided within the data collecting division 11 for controlling each of the data collecting devices provided for each of the EPG data transmitting devices, numeral 112 denotes a data collecting device for collecting the EPG data of the EPG data transmitting section 2a, numeral 113 denotes a data collecting device for collecting the EPG data of the EPG data transmitting section 3a, numeral 131 denotes a data delivery control section that is provided within the data delivering division 13 for controlling the data delivering devices provided for each of the EPG data providing devices, numeral 133 denotes an EPG data delivering device for delivering the EPG data to the EPG data providing device 4b. Other configuring members are the same as those in the first embodiment, so that the detailed explanation thereof is omitted here.

The operation of the EPG data collection and delivery system according to the present embodiment is now explained below.

When the modified own-station EPG data of the TV broadcasting station 2 is transmitted from the EPG data transmitting device 2a thereof to the EPG data collection and delivery center 1, the data collecting device 112 in the data collecting division 11 writes the thus transmitted data into the all-station EPG data base 12, and also informs it to the data collection control section 111, simultaneously. The data collection control section 111 informs thereafter to the delivery control section 131 of the fact that the all-station EPG data base 12 has been modified.

The data delivery control section 131 gives a command to carry out a data transmission to all the EPG data delivering devices 132, 133 . . . , or to all the data delivering devices except the data delivering device 132 that interfaces with the EPG data providing device 2a of the TV broadcasting station 2 from which the modified own-station EPG data has been transmitted. All the data delivering devices that have received the data-transmission command read out the specified EPG data from the all-station EPG data base 12, and thereafter distribute the thus read-out data to the corresponding data providing devices.

As explained above, according to the ninth embodiment, it is arranged such that a plurality of data collecting devices each corresponding to the EPG data transmitting devices 2a and 3a respectively of the broadcasting stations 2 and 3 are provided within the data collecting division 11 of the EPG data collection and delivery center 1, these data can be collected in parallel from each of the EPG data transmitting devices 2a and 3a, so that the time to be consumed for collection of the data can be shortened.

Further, since it is arranged such that there are provided data delivering devices 132, 133 corresponding to the data providing devices 2b and 4b, respectively of the broadcasting stations 2 and 4 within the data delivering division 13 of the EPG data collection and delivery center 1, these data can be delivered in parallel to each of the EPG data providing devices 2b and 4b, so that the data distribution can be performed impartially and the time to be consumed for delivery of the data can thereby be shortened.

(Tenth Embodiment)

In the first to ninth embodiments above, transmission of the respective own-station EPG data from each of the EPG data transmitting devices is carried out actively by the EPG data transmitting devices. However, in this tenth embodiment, the EPG data collection and delivery center 1 first requires a transmission of data to each of the EPG data transmitting devices of the respective broadcasting stations, and on receiving this requirement, each of the EPG data transmitting devices of the respective broadcasting stations transmits the respective own-station EPG data.

By this procedure, according to this tenth embodiment, the data which is not required to be transmitted in real time can be collected in accordance with the load state of the EPG data collection and delivery center 1.

Further, although transmission of all-station EPG data from the EPG data collection and delivery center 1 to each of the EPG data providing devices of the respective broadcasting stations is performed actively from the center 1 side, it can be performed by a requirement from each of the EPG data providing devices to the EPG data collection and delivery center 1. By doing so, the EPG data providing devices can obtain the EPG data in accordance with the load state of the center 1.

(Eleventh Embodiment)

In the first to ninth embodiments above, the EPG data collection and delivery center 1 stored temporarily the EPG data transmitted from the EPG data transmitting device of each of the broadcasting stations, and immediately after the modification or addition of the data, delivers all-station EPG data to all the broadcasting stations. However, in the case of addition of data, there is no need for the EPG data collection and delivery center 1 to distribute the data to each of the EPG data providing devices.

For this reason, in this eleventh embodiment, it is arranged such that in the case of addition of EPG data, the data transmitting section of the EPG data transmitting device of each of the broadcasting stations transmits data to the EPG data collection and delivery center 1, together with the specified time at which the data is to be delivered to each of the EPG data providing devices from the center 1, and the EPG data collection and delivery center 1 does not deliver the data until the specified time.

Figure 10:
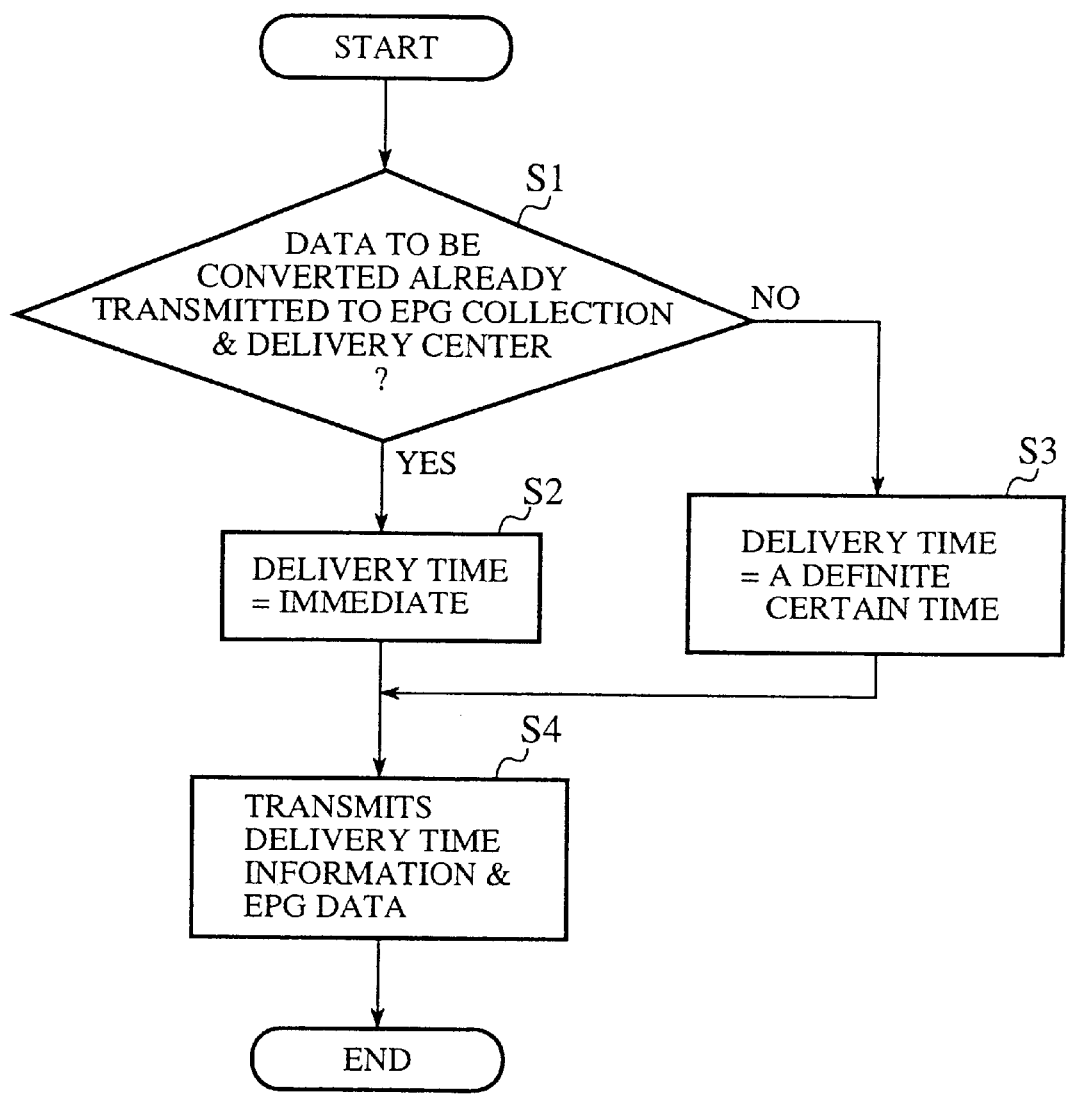
FIG. 10 is a flowchart showing the procedure carried out in the data transmission section in the EPG data transmitting device of each of the broadcasting stations.

Next, the data transmission within the data transmitting section in the data transmitting device of each of the broadcasting stations according to the eleventh embodiment is shown in flowchart with reference to FIG. 10.

For example, in a case when there is a modification in or an addition to the own-station database 22 in the data transmitting device 2a of the TV broadcasting station 2, the data transmitting section 21 in the same data transmitting device 2a checks in step S1 as to whether the data to be transmitted is related to the EPG data which has already been transmitted to the EPG data collection and delivery center 1.

Here, if the data to be transmitted is related to the one that has been already transmitted to the center 1 ("Yes" in step S1), it means that it is the case of modification of the EPG data, so that the time at which the data is to be delivered to each of the EPG data providing sections is set to "Immediate" in the next step S2, and if the answer is "N0" in step S1, in other words, if it is the case that the data to be transmitted is not related to the one that has been already transmitted to the center 1, it means that it is the case of addition of the EPG data, or that the time at which the data is to be delivered is set to a specified definite time, for example, as "X month, Y date, a hour, b minutes, c seconds", and thereafter in both cases in the next step S4, the time at which the data is to be delivered set in steps S2 and S3 and the EPG data itself are transmitted to the EPG data collection and delivery center 1.

As explained above, according to this eleventh embodiment, in the case that the EPG data transmitting device transmits to the EPG data collection and delivery center 1 also the time at which the data is to be delivered to each of the EPG data providing sections, together with the EPG data itself, if it is the case of addition of EPG data in which the data will not necessarily be transmitted immediately, each of the broadcasting stations can transmit the data to the EPG data collection and delivery center 1, for example, at such a moment as the end of a day or when there are not many occurrences of the data modification cases.

Further, in a case that there are all-station EPG data which are to be delivered to each of the EPG data providing devices, but still accumulated in the EPG data collection and delivery center 1, and that there is a modification in the EPG data of one broadcasting station, the EPG data transmitting device of that broadcasting station sets the data delivering time to "immediate", and sends it together with the EPG data to the EPG data collection and delivery center 1, so that it affects only the inner processing within the center 1, but not to the EPG data providing device of each of the broadcasting stations, and due to this, unnecessary data transmission between the EPG data collection and delivery center 1 and the EPG data providing devices can be omitted.

(Twelfth Embodiment)

The EPG data collection and delivery center 1 delivers all-station EPG data to the EPG data providing devices in the first to ninth embodiments above, and in this twelfth embodiment, it is further arranged such that the center 1 also transmits the time at which the data is to be delivered.

By specifying the data delivery starting time, according to this twelfth embodiment, the EPG data providing device of each of the broadcasting stations can know the delivery starting time of the all-station EPG data, but even without analyzing the contents of the all-station EPG data delivered from the EPG data collection and delivery center 1, so that it can be readily checked whether or not the all-station EPG data is required to be delivered in real time.

Further, within the EPG data providing device of each of the broadcasting stations that has received all-station EPG data transmitted from the EPG data collection and delivery center 1, when the delivered data is to be converted or the like, the all-station EPG data which is not necessary to be delivered in real time can be processed later in accordance with the load state of the EPG data providing device itself, through checking the delivery starting time set to the all-station EPG data.

(Thirteenth Embodiment)

When the EPG data stored in the EPG data collection and delivery center 1 is to be modified in the first to ninth embodiments above, it is further arranged in this thirteenth embodiment such that in both the transmission of EPG data from the EPG data transmitting device to the EPG data collection and delivery center 1, and delivery of all-station EPG data from the EPG data collection and delivery center 1 to each of the EPG data providing devices, only the difference between the own-station EPG data or all-station EPG data stored in the center 1, and the modified EPG data or all-station EPG data is transmitted.

For example, when a sport program is delayed for 30 minutes in one broadcasting station, the EPG data before modification as shown in FIG. 11A becomes the modified EPG data as shown in FIG. 11B. More specifically, as shown in FIGS. 11A and 11B, the broadcasting duration time of the sport program "Sport 1" is delayed for 30 minutes, namely prolonged from the originally set duration time 120 minutes to 150 minutes, and as a result, the broadcast starting time of the "drama 3" is modified from the "1998.7.7.21;00:00" shown in FIG. 11A to "1998.7.7.21;30:00" as shown in FIG. 11B.

For this reason, in order to identify the modification EPG data, the EPG data transmitting device of a broadcasting station in which there has been a modification in the data informs to the center 1 of such information as channel identification information "Source id_"0x1234" corresponding to the channel of each of the broadcasting stations, the program identification data such as "event id_"0x3333" and "0x3334" corresponding to the program whose EPG data is to be modified, and difference data such as "(broadcasting) duration+30 min." which is the modified content with respect to the program of the "event id_"0x3333" and "(broadcasting) start time+30 min." which is the modified content with respect to the program of the "event id_"0x3334".

Further, also the EPG data collection and delivery center 1 modifies the all-station EPG data in each of the broadcasting stations, by transmitting only the above different data to the EPG data providing device of each of the broadcasting stations, together with the additional information.

As explained above, according to the thirteenth embodiment of the present invention, in the case of modifying the data stored in the EPG data collection and delivery center 1, the data transmission between the EPG data collection and delivery center 1 and the EPG data transmitting device of each of the broadcasting stations, and between the EPG data collection and delivery center 1 and the EPG data providing device of each of the broadcasting stations can be greatly reduced, by sending only the different data therebetween.

(Fourteenth Embodiment)

The EPG data collection and delivery system according to the fourteenth embodiment of the present invention is now explained as follows.

Figure 12:
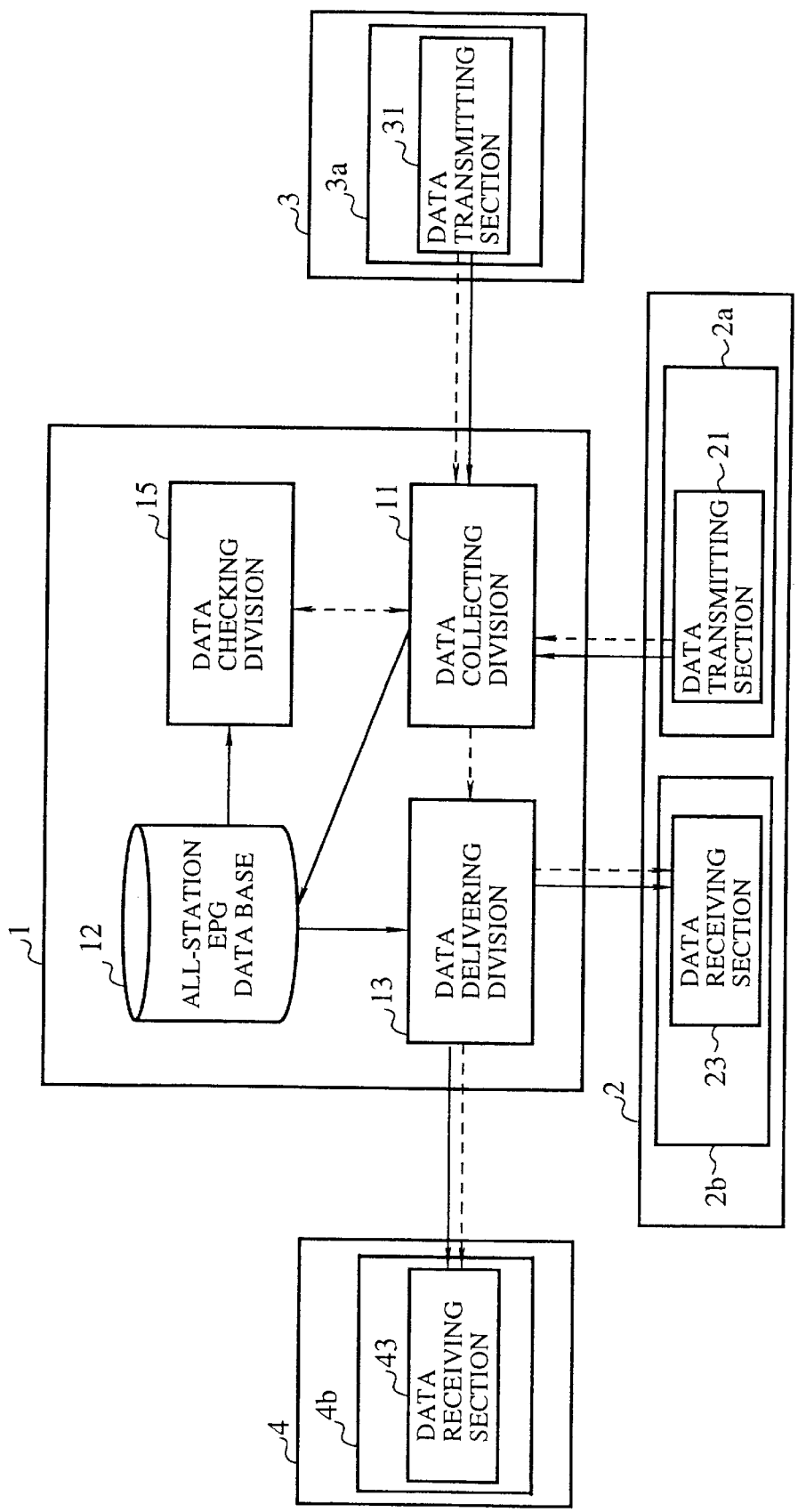
FIG. 12 is a schematic diagram of an EPG data collection and delivery system according to the fourteenth embodiment of the present invention.
Figure 13:
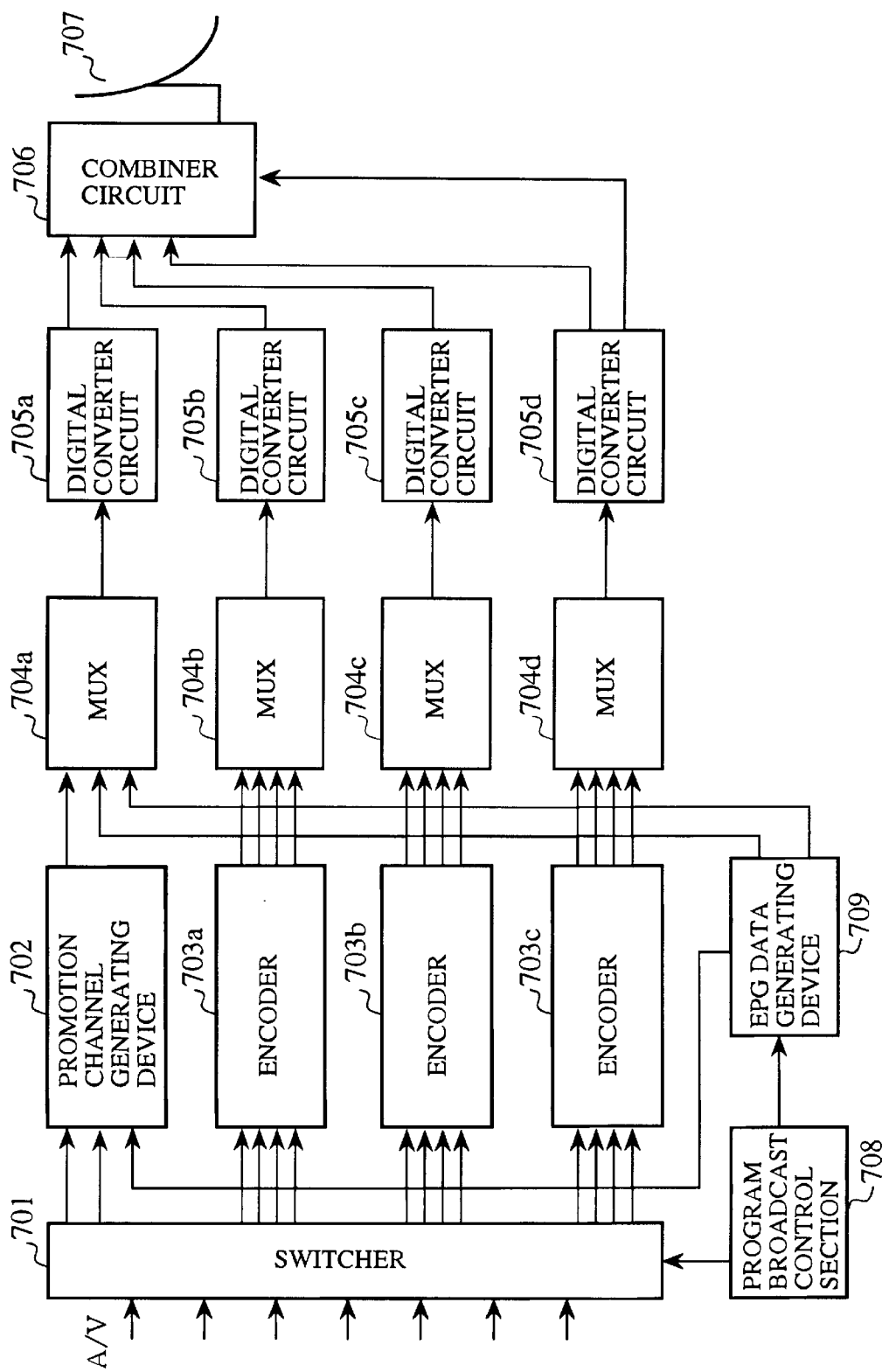
FIG. 13 is a schematic view showing a conventional EPG transmitting device.

FIG. 12 is a schematic diagram of the EPG data collection and delivery system of this fifth embodiment. In the figure, reference numerals 1 through 4, 11 through 13, 2a, 2b, 21, 23, 3a, 31, 4b and 43 are same as the configuring elements of the first embodiment shown in FIG. 1, wherein reference numeral 15 denotes a data checking section provided in the EPG data collection and delivery center 1 for checking the collected EPG data.

The operation of the EPG data collection and delivery system according to the present embodiment is now explained below.

When the EPG data is transmitted from the TV broadcasting satin 2 to the EPG data collection and delivery center 1, the data collecting division 11 of the EPG data collection and delivery center 1 writes the EPG data to all-station EPG data base 12, and also informs the data checking section 15 of the fact that the all-station EPG data has been updated.

The data checking section 15 checks the content of the updated EPG data. Further, when there is a limit to the capacity for transmitted data, it can convert the data to its transmission format if required, and checks the capacity. The result of the check is informed to the data collecting division 11, and if there is any error in the content of the EPG data, or the transmission capacity is overflown, the data collecting division 11 informs the data error to the EPG data transmitting device 2a of the TV broadcasting station 2 from which the EPG data has been transmitted.

When the EPG data transmitting device 2a of the TV broadcasting station 2 receives data error information from the EPG data collection and delivery center 1, it, for example, gives an alarm to the EPG data generator, and after the data correction is performed, it sends back the own-station EPG data to the EPG data collection and delivery center 1.

As explained above, according to the fourteenth embodiment, by checking the EPG data collected from each of the broadcasting stations in the EPG data collection and delivery center 1, the EPG data having error therein can be rapidly corrected, so that an error-free correct EPG data can be delivered to the EPG data providing device.

(Fifteenth Embodiment)

When the EPG data collection and delivery center 1 delivers all-station EPG data to the EPG data providing devices in the first embodiment, in this twelfth embodiment, it is arranged such that the center 1 also transmits the delivery control information of all-station EPG data in each of the broadcasting stations.

For example, when the EPG data collection and delivery center 1 delivers the EPG data to each of the EPG data providing devices on the basis of the ARIB Standard STD-B10 "Program Arrangement Information for use in digital broadcasts", all-station EPG data is transmitted in accordance with an EPG table consisting of a plurality of tables, and the transmission frequency of the respective tables are regulated. For example, the transmission frequency of the EIT (Event Information Table) that informs the current and next program guide data of the own station will be once or more than once per every two seconds. If there is a limit in the transmission rate of all-station EPG data which is delivered from the EPG data providing device of each broadcasting stations to the program guide viewers, the EPG data collection and delivery center 1 specifies the transmission rate per each EPG table in accordance with the capacity of the collected all-station EPG data to the data providing device of each of the broadcasting stations, in order that it does not exceed the limit of the transmission-rate.

For this reason, according to this fifteenth embodiment, the data transmission control section of the EPG data providing device of each of the broadcasting stations transmits all-station EPG data to the multiplexing section thereof at a frequency specified by the EPG data to the multiplexing section hereof, and the multiplexing section multiplexes the all-station EPG data and delivers it to the program guide viewers.

As explained above, according to this fifteenth embodiment, since it is arranged such that the EPG data collection and delivery center 1 informs the EPG data delivery control information to the EPG data providing device of each of the broadcasting stations, so that all the EPG data providing devices can deliver the correct EPG data, and each EPG data providing device does not have to consider the limit of transmission rate of the EPG data.

Further, in case there is a modification in the limit of the transmission rate, this change can be disposed only within the EPG data collection and delivery center.

AS explained heretofore, according to the present invention, there is provided an EPG data collection and delivery center within an EPG data collection and delivery system, the center collects own-station EPG data from all the EPG data transmitting devices, and also delivers all-station EPG data to all the EPG data providing devices, so that each of the EPG data providing devices can obtain EPG data of all the stations within the EPG data collection and delivery system, and provide thereafter to the program guide viewers.

Further, each of the EPG data transmitting devices and the EPG data providing devices only have access to the EPG data collection and delivery center, even if there is an increase in the number of broadcasting stations or EPG data providing devices within the system, the EPG data collection and delivery system can be expanded without causing any affect to the already existing devices.

As a result, even when a frequent occurrence of modification in the EPG data can be observed, the accessing frequency between broadcasting stations is not raised, and also even when a new broadcasting station is added to the system, each of the broadcasting stations can provide the latest EPG data of other stations to the program guide viewers of their own-stations, but without changing the system in each broadcasting station.

What is claimed is:

1. A program guide data collection and delivery system comprising:
   a plurality of program guide data transmitting devices respectively included in a corresponding one of a plurality of broadcasting stations, a plurality of program guide data providing devices and a program guide data collection and delivery device that is provided independently of said plurality of broadcasting stations and said program guide data transmitting devices and of said program guide data providing devices, wherein
   each of said program guide data transmitting devices transmits program guide data of the corresponding one of broadcasting stations to said program guide data collection and delivery devices;
   said program guide data collection and delivery device collects program guide data of the plurality of broadcasting stations respectively broadcasting their own programs, and transmits all the thus collected plurality of program guide data to all the plurality of program guide data providing devices, irrespective of whether or not program corresponding to said program guide data are broadcast by each of said broadcasting stations; and
   each of said plurality of program guide data providing devices provides the program guide data of all of the plurality of broadcasting stations including program guide data of other stations, which have been delivered from said program guide data collection and delivery device, to the program guide viewers of each of their own broadcasting stations, irrespective of whether or not the programs corresponding to said program guide data are broadcast.

2. A program guide data collection and delivery system according to claim 1, wherein each of said plurality of program guide data transmitting devices comprises:
   an own-station program guide data storing section for storing the program guide data broadcast from its own broadcasting station; and
   a data transmitting section for transmitting said own-station program guide data of its own broadcasting station to said program guide data collecting division of said program guide data collection and delivery device;
   wherein said program guide data collection and delivery device comprises;
   a data collecting division for collecting program guide data of each of the plurality of broadcasting stations transmitted from said plurality of program guide data transmitting devices;
   a program guide data storing section for storing the program guide data of each of the plurality of broadcasting stations collected by said data collecting division;
   a data delivering division for delivering the stored plurality of program guide data to all the plurality of program guide data providing devices all at once, irrespective of whether or not programs corresponding to said program guide data are broadcast by each of said broadcasting stations; and
   wherein each of said plurality of program guide data providing devices comprises:
   a data receiving section for receiving the program guide data of all the plurality of broadcasting stations including program guide data of the stations which have been delivered from said program guide data collection and delivery device, to the program guide viewers of each of their own broadcasting stations, irrespectively of whether o not the programs corresponding to said program guide data are broadcast;
   an all-station program guide data storing section for storing the received program guide data of all the plurality of broadcasting stations;
   a data converting section for converting the program guide data stored in said all-station program guide data storing section to a predetermined format; and
   a transmission control section for controlling the transmission of the program guide data converted to said predetermined format in said data converting section.

3. A program guide data collection and delivery system according to claim 2, wherein said data transmitting section in said program guide data transmitting device of its own broadcasting station directly rewrites the data stored in said all-station program guide data storing section in the corresponding program guide data providing device in a case that there has been a modification in the data in said own-station program guide data storing section and also informs the corresponding data converting section of the fact that there has been a modification in said all-station program guide data storing section.

4. A program guide data collection and delivery system according to claim 1, wherein each of said plurality of program guide data transmitting devices comprises:
   an own-station program guide data storing section for storing the program guide data broadcast from its own broadcasting station, and
   a data transmitting section for transmitting said own-station program guide data of its own broadcasting station to said program guide data collecting division of said program guide data collection and delivery device,
   wherein said program guide data collection and delivery device further comprises:
   a data collecting division for collecting said program guide data of all of the broadcasting stations;
   a program guide data storing division for storing the received program guide data of all of the plurality of broadcasting stations;
   a data converting section for converting the program guide data stored in said all-station program guide data storing section to a predetermined format; and
   a data delivering division for delivering the format-converted program guide data of each of said broadcasting stations, including program guide data of other stations, which have been delivered from said program guide data collection and delivery device, to the program guide viewers of each of their own broadcasting stations, irrespective of whether or not the programs corresponding to said program guide data are broadcast, a transmission control section for controlling the transmission of the program guide data converted to said predetermined format, and wherein each of said plurality of program guide data providing devices comprises:

a data receiving section for receiving the program guide data of all of the plurality of broadcasting stations including program guide data of other stations, which have been delivered from said program guide data collection and delivery device, to the program guide viewers of each of their own broadcasting stations, irrespective of whether or not the programs corresponding to said program guide data are broadcast, a data storing division for storing all the program guide data received from each of the plurality of broadcasting stations; and a transmission control section for controlling the stored all the program guide data of each of the plurality of broadcasting stations.

5. A program guide data collection and delivery system according to claim 4, wherein said program guide data transmitting device further comprises a data converting section for converting the program guide data stored in said own-station program guide data storing section to a predetermined format, and wherein in a case that there has been a modification in the data in said own-station program guide data, said data converting section reads out the data stored in said own-station program guide data storing means, and directly updates the data stored in said transmission control section.

6. A program guide data collection and delivery system according to claim 1, wherein said program guide data transmitting device further comprises:

an own-station program guide data storing section for storing program guide data of its own-station;

a data converting section for converting the program guide data stored in said own-station program guide data storing section to a predetermined format; and a data transmitting section for transmitting said own-station program guide data of its own broadcasting station to said program guide data collecting division of said program guide data collection and delivery device;

wherein said program guide data collection and delivery device comprises:

a data collecting division for collecting said program guide data of all of the plurality of broadcasting stations;

a data delivering division for delivering the format-converted program guide data of each of said broadcasting stations including program guide data of other stations, which have been delivered from said program guide data collection and delivery device, to the program guide viewers of each of their own broadcasting stations, irrespective of whether or not the programs corresponding to said program guide data are broadcast;

and wherein each of said plurality of program guide data providing devices comprises:

a data receiving division for receiving said program guide data of all of the plurality of broadcasting stations including program guide data of other stations, which have been delivered from said program guide data collection and delivery device, to the program guide viewers of each of their own broadcasting stations, irrespective of whether or not the programs corresponding to said program guide data are broadcast; and a transmission control section for controlling the transmission of the thus received all the program guide data of each of the plurality of broadcasting stations.

7. A program guide data collection and delivery system according to claim 2, wherein said data collecting division in said program guide data collection and delivery device comprises;

a plurality of collecting sections corresponding to each of said program guide data transmitting devices, and a collection control section for controlling said plurality of collecting sections, and wherein said data delivering division of said program guide data collection and delivery device comprises;

a delivering section corresponding to each of said program guide data providing devices, and a delivery control section for controlling said plurality of delivering sections.

8. A program guide data collection and delivery system according to claim 1, wherein each of said program guide data transmitting devices requires a transmission of the program guide data to said program guide data collection and delivery device.

9. A program guide data collection and delivery system according to claim 1, wherein said program guide data collection and delivery device requires a transmission of program guide data to each of said program guide data transmitting devices.

10. A program guide data collection and delivery system according to claim 1, wherein said program guide data collection and delivery device requires a transmission of program guide data to each of said program guide data providing devices.

11. A program guide data collection and delivery system according to claim 1, wherein each of said program guide data providing devices requires a transmission of program guide data to said program guide data collection and delivery device.

12. A program guide data collection and delivery system according to claim 1, wherein when each of said program guide data transmitting devices transmits the program guide data of its own broadcasting station, it indicates the delivery starting time for starting the delivery of said program guide data to each of said program guide data providing devices.

13. A program guide data collection and delivery system according to claim 1, wherein said program guide data collection and delivery device additionally indicates the delivery service starting time for starting the delivery of said program guide data to the program guide viewers, when it transmits the program guide data of all the broadcasting stations.

14. A program guide data collection and delivery system according to claim 2, wherein when a data modification has occurred in the program guide data of its own broadcasting station, each of said program guide data transmitting devices makes the program guide data to be transmitted to said program guide data collection and delivery device as a difference between the program guide data already transmitted and the program guide data after modification.

15. A program guide data collection and delivery system according to claim 2, wherein when said program guide data collection and delivery devices modifies the program guide data stored in said program guide data storing section therein, it makes the program guide data to be transmitted to each of said program guide data providing devices as a difference between the program guide data already transmitted and the program guide data after modification.

16. A program guide data collection and delivery system according to claim 1, wherein said program guide data collection and delivery device is provided with a data checking section for checking the data amount and the content of the program guide data transmitted from each of said program guide data transmitting sections.

17. A program guide data collection and delivery system according to claim 1, wherein said program guide data collection and delivery device transmits service control information regarding the method of providing program guide data to each of said program guide data providing devices.

18. A program guide data collection and delivery device independently provided from a plurality of program guide data transmitting devices respectively included in a corresponding one of a plurality of broadcasting stations, and a plurality of program guide data providing devices wherein said program guide data collection and delivery device is configured to;

collect program guide data of the plurality of broadcasting stations respectively broadcasting their own programs, transmit all the collected plurality of program guide data to all the plurality of program guide data providing devices, irrespective of whether or not programs corresponding to said program guide data are broadcast by each of said broadcasting stations, and make each of said plurality of program data providing devices provide the program guide data of all of the plurality of broadcasting stations including program guide data of other stations, which have been delivered from said program guide data collection and delivery device, to the program guide viewers of each of their own broadcasting stations, irrespective of whether or not the programs corresponding to said program guide data are broadcast.

19. A plurality of program guide data providing device for providing program viewers of a plurality of broadcasting stations with program guide data corresponding to each of said broadcasting stations delivered from a program data collection and delivery device provided independently of a plurality of said broadcasting stations;

wherein the program guide data to be delivered from said program data collection and delivery device are the program guide data that said program guide data collection and delivery device has received and collected from the plurality of broadcasting stations respectively broadcasting their own programs and transmitted to all the plurality of program guide data providing devices all at once, irrespective of whether or not programs corresponding to said program guide data are broadcast by each of said broadcasting stations;

and wherein each of said plurality of program guide data providing devices provides the program guide data of all of the plurality of broadcasting stations including program guide data of other stations which have been delivered from said program guide data collection and delivery device to the program guide viewers of each of their own broadcasting stations irrespective of whether or not the programs corresponding to said program guide data are broadcast.

* * * * *